US009162163B2

(12) United States Patent
Yoshida et al.

(10) Patent No.: US 9,162,163 B2
(45) Date of Patent: Oct. 20, 2015

(54) PROCESSING LIQUID SUPPLY METHOD, PROCESSING LIQUID SUPPLY APPARATUS AND STORAGE MEDIUM

(71) Applicant: Tokyo Electron Limited, Tokyo (JP)

(72) Inventors: Yuichi Yoshida, Kumamoto (JP);
Ryouichirou Naitou, Kumamoto (JP);
Toshinobu Furusho, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 14/034,774

(22) Filed: Sep. 24, 2013

(65) Prior Publication Data

US 2014/0097147 A1    Apr. 10, 2014

(30) Foreign Application Priority Data

Oct. 9, 2012   (JP) .................... 2012-224331

(51) Int. Cl.
*B01D 19/00* (2006.01)
*B01D 36/00* (2006.01)
*C02F 1/20* (2006.01)
(Continued)

(52) U.S. Cl.
CPC .......... *B01D 19/0036* (2013.01); *B01D 36/001* (2013.01); *B01D 37/046* (2013.01); *B01D 2201/202* (2013.01); *B01D 2201/204* (2013.01); *B01D 2221/14* (2013.01); *C02F 1/20* (2013.01); *C02F 2103/346* (2013.01); *C02F 2209/03* (2013.01)

(58) Field of Classification Search
CPC .... C02F 1/20; C02F 2103/04; C02F 2103/12; C02F 2103/346; C02F 2209/03; C02F 2301/063; C02F 2303/22; C02F 2303/26; B01D 19/0036; B01D 2201/202; B01D 2201/204; B01D 2221/14; H01L 21/027
See application file for complete search history.

(56) References Cited

U.S. PATENT DOCUMENTS

| 6,238,576 B1 * | 5/2001 | Yajima .................... 210/767 |
| 6,402,821 B1 * | 6/2002 | Matsuyama ............... 96/175 |
| 6,418,942 B1 * | 7/2002 | Gray et al. ................ 134/1.3 |

(Continued)

FOREIGN PATENT DOCUMENTS

| JP | 04-196517 A | 7/1992 |
| JP | 3461725 A   | 7/2003 |

OTHER PUBLICATIONS

Aiwen Wu, Wailup Chow, A technique for rapid elimination of microbubbles for photochemical filter startup, 2008, Lithography Asia, vol. 7140, pp. 1-9.*

(Continued)

*Primary Examiner* — Lucas Stelling
*Assistant Examiner* — Rohit K Dewan
(74) *Attorney, Agent, or Firm* — Abelman, Frayne & Schwab

(57) ABSTRACT

Disclosed are an apparatus and a method for reducing a processing liquid consumed for removing bubbles from a new filter unit, and shortening a start-up time when the filter unit is attached in a processing liquid supply passage. The method includes: filling the processing liquid into a new filter unit, decompressing inside of the filter unit into a first pressure atmosphere in order to remove bubbles from the filter unit, boosting a pressure of the inside of the filter unit, flowing the processing liquid into the filter unit from a primary side of the filter unit, and supplying the processing liquid flowing from the filter unit to an object to be processed through a nozzle thereby performing a liquid processing and quickly removing the bubbles.

14 Claims, 29 Drawing Sheets

(51) Int. Cl.
*C02F 103/34* (2006.01)
*B01D 37/04* (2006.01)

(56) References Cited

U.S. PATENT DOCUMENTS

2007/0119307 A1* 5/2007 Park et al. .................. 96/243
2007/0131604 A1* 6/2007 Nomura ................ 210/321.69
2007/0267065 A1* 11/2007 Okumura et al. ............. 137/208

OTHER PUBLICATIONS

Google search query "increasing pressure filter remove bubbles semiconductor".*

"Atmospheric pressure." Dictionary.com Unabridged. Random House, Inc. Sep. 30, 2014. <Dictionary.com http://dictionary.reference.com/browse/atmospheric pressure>.*

* cited by examiner

PROCESSING LIQUID SUPPLY METHOD, PROCESSING LIQUID SUPPLY APPARATUS AND STORAGE MEDIUM

CROSS-REFERENCE TO RELATED APPLICATIONS

This application is based on and claims priority from Japanese Patent Application No. 2012-224331, filed on Oct. 9, 2012, with the Japan Patent Office, the disclosure of which is incorporated herein in its entirety by reference.

TECHNICAL FIELD

The present disclosure relates to a processing liquid supply apparatus that ejects a processing liquid from a nozzle through a filter unit, in which bubbles within the filter unit are removed.

BACKGROUND

In a manufacturing process of a semiconductor device, a liquid processing is performed by supplying a chemical liquid such as, for example, a resist, an acid or alkaline cleaning liquid, a solvent, and an insulating film forming precursor-containing liquid, to a substrate from a nozzle. An apparatus for supplying such a chemical liquid is configured to remove foreign substances by interposing a filter unit within a supply passage. For example, Japanese Patent No. 3461725 discloses a resist coating apparatus which is a chemical liquid supply apparatus.

In such a process, bubbles may occur by a gas dissolved within the resist or the chemical liquid. As the line width of a pattern becomes miniaturized, it is required to carefully cope with the fine bubbles that were not problems before.

Japanese Patent Laid-Open Publication No. H04-196517 discloses an apparatus for coating such a processing liquid, in which when a filter unit configured to remove foreign substances within the processing liquid is newly attached (in both cases where the apparatus is started up or the filter unit is replaced), a process of removing a gas within the filter unit by flowing the processing liquid into the attached filter unit is performed (hereinafter, referred to as "filter wetting"). In a conventional filter wetting method, filtration is performed by a positive pressure (e.g., a pressure not lower than an atmospheric pressure) caused by $N_2$ gas or a pump after setting of a filter unit, and the number of defects caused by bubbles is monitored on a wafer. Then, at a point of time when the number of defects is decreased to a predetermine level, the gas within the filter unit is considered to be removed, and the process is considered to be completed.

However, from the viewpoint of a mass production cost, it is required to reduce the amount of processing liquid to be consumed at the start-up of the filter unit, and to shorten the start-up time.

SUMMARY

The present disclosure provides a method for supplying a processing liquid, including filling the processing liquid into a new filter unit; decompressing inside of the filter unit into a first pressure atmosphere which is a negative pressure atmosphere in order to remove bubbles from the filter unit; boosting the inside of the filter unit from the first pressure atmosphere to be a target pressure atmosphere; flowing the processing liquid into the filter unit from a primary side of the filter unit in a state where a secondary side of the filter unit is maintained at a second pressure atmosphere which is higher than the first pressure atmosphere; and supplying the processing liquid flowing from the filter unit to an object to be processed through a nozzle thereby performing a liquid processing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
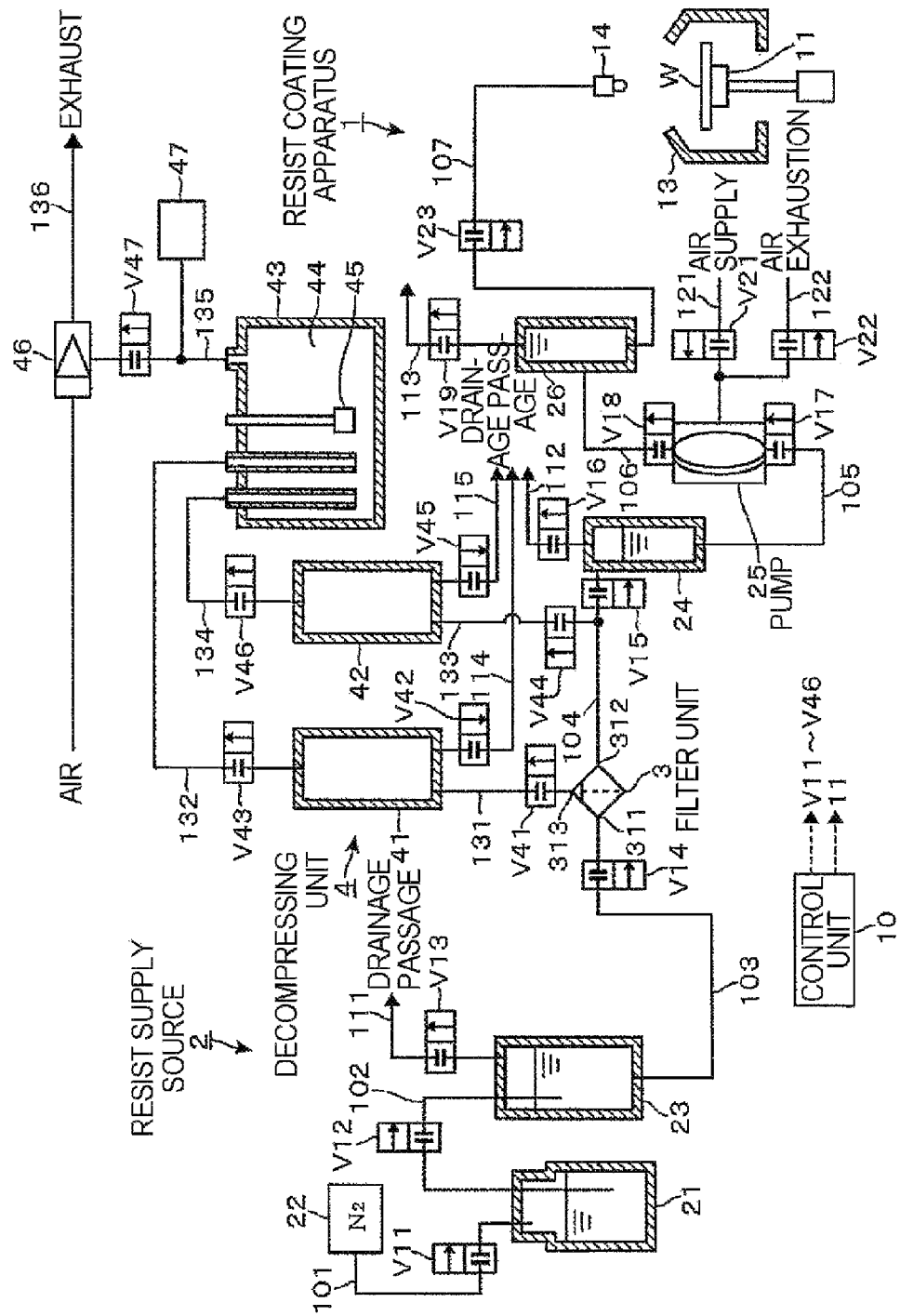
FIG. 1 is a view illustrating a resist coating apparatus in its entirety according to a first exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

The present disclosure has been made in consideration of the above described problems, and an object thereof is to provide a technology of reducing a processing liquid consumed for removing bubbles from a filter unit and shortening a start-up time, when the filter unit is newly attached in a processing liquid supply passage.

An aspect of the present disclosure is to provide a method for supplying a processing liquid, including: filling the processing liquid into a new filter unit; decompressing inside of the filter unit into a first pressure atmosphere which is a negative pressure atmosphere in order to remove bubbles from the filter unit; boosting the inside of the filter unit from the first pressure atmosphere to be a target pressure atmosphere; flowing the processing liquid into the filter unit from a primary side of the filter unit in a state where a secondary side of the filter unit is maintained at a second pressure atmosphere which is higher than the first pressure atmosphere; and supplying the processing liquid flowing from the filter unit to an object to be processed through a nozzle thereby performing a liquid processing.

The second pressure atmosphere is a negative pressure atmosphere which has a lower pressure than the target pressure atmosphere, and has a higher pressure than the first pressure atmosphere.

The first pressure atmosphere is formed by decompression of a process pump that is provided between the filter unit and the nozzle, and configured to deliver the processing liquid to the nozzle.

The first pressure atmosphere may alternatively be formed by a decompressing unit separate from the process pump that is configured to deliver the processing liquid to the nozzle.

The first pressure atmosphere has a pressure ranging from −51 kPa to −80 kPa.

The boosting of the inside of the filter unit to be the target pressure atmosphere is to place the inside of the filter unit to be at atmospheric pressure.

After supplying the processing liquid to the object to be processed to perform the liquid processing, an inspection of the liquid processing on the object is performed. When an inspection result is poor, a series of processes from placing the inside of the filter unit under the first pressure atmosphere to placing the inside of the filter unit under the second pressure atmosphere are performed again.

Another aspect of the present disclosure is to provide an apparatus for supplying a processing liquid to an object to be processed from a nozzle to perform a liquid processing, including: a processing liquid supply source, a filter unit and the nozzle provided sequentially from an upstream side; a primary side valve, a secondary side valve, and a venting valve provided at a primary side, a secondary side, and a vent of the filter unit, respectively; a decompressing unit configured to decompress inside of the filter unit; and a control unit configured to control the valves and the decompressing unit. The control unit executes a program stored in a computer-readable recording medium that, when executed, causes a computer to perform: filling the processing liquid into a filter unit by supplying the processing liquid from the primary side of the filter unit; decompressing the inside of the filter unit into a first pressure atmosphere which is a negative pressure atmosphere by the decompressing unit in a state where at least one of the primary side valve, the secondary side valve and the venting valve is closed and another valve is opened, boosting the inside of the filter unit from the first pressure atmosphere to be a target pressure atmosphere by opening the valve in the closed state; and flowing the processing liquid into the filter unit from the primary side of the filter unit in a state where the secondary side of the filter unit is maintained at a second pressure atmosphere which is higher than the first pressure atmosphere, and supplying the processing liquid to the object through the nozzle to perform the liquid processing.

A process pump is provided between the filter unit and the nozzle, the second pressure atmosphere is a negative pressure atmosphere which has a lower pressure than the target pressure atmosphere, and the flowing of the processing liquid from the primary side of the filter unit is performed by forming the second pressure atmosphere by the process pump.

The process pump additionally serves as the decompressing unit.

Alternatively, the decompressing unit may be provided separately from the process pump.

The first pressure atmosphere has a pressure ranging from −51 kPa to −80 kPa.

The boosting of the inside of the filter unit to be the target pressure atmosphere is to place the inside of the filter unit to be an atmospheric pressure.

A further aspect of the present disclosure is to provide a storage medium for recording a computer program used in an apparatus for supplying a processing liquid. The program includes a group of steps for executing the processing liquid supply method described above which are incorporated in the computer program. The apparatus is configured to supply the processing liquid to an object to be processed from a nozzle to perform a liquid processing, and includes a processing liquid supply source, a filter unit and the nozzle provided sequentially from an upstream side.

In the present disclosure, when a new filter unit is attached in a processing liquid supply passage, a negative pressure atmosphere which is lower than a pressure state at the time of a process of supplying a processing liquid to an object to be processed through the filter unit is formed in the filter unit. Thus, bubbles within the filter unit may be quickly removed, and remaining bubbles may be reduced. Accordingly, the start-up time and the amount of a consumed processing liquid required until the filter unit is immersed by the processing liquid and then is provided to an actual operation, may be shortened and reduced. The time when the new filter unit is attached includes attachments of the new filter unit in both cases where the apparatus is started up or the filter unit is replaced.

First Exemplary Embodiment

Hereinafter, a resist coating apparatus 1 which is a processing liquid supply apparatus according to an exemplary embodiment of the present disclosure will be described. In the resist coating apparatus 1, a filter wetting process described in the background art section, and a resist coating process for supplying a resist filtered by the wet filter to a wafer W which is a substrate are performed. FIG. 1 illustrates the entire configuration of the resist coating apparatus 1.

The resist coating apparatus 1 includes a cup 13 that includes a spin chuck 11 configured to horizontally hold the wafer W, and a nozzle 14 configured to supply a resist as a processing liquid to the center of the wafer W held by the spin chuck 11. The resist coating apparatus 1 is provided with a piping system connected to the nozzle 14. The piping system includes a resist supply source 2, a filter unit 3, and a pump 25 in this order from the upstream side, and is configured such that through operation of the pump 25, the resist of the resist supply source 2 is filtered by the filter unit 3, and is ejected from the nozzle 14. A decompressing unit 4 configured to perform the filter wetting process is connected to the piping system.

The cup 13 is provided to surround the spin chuck 11, and receives the resist scattered from the wafer W. An exhaust passage for exhausting the inside of the cup, and a waste liquid passage for removing a waste liquid within the cup are connected at the bottom of the cup 13.

The resist supply source 2 will be described. The resist supply source 2 includes a bottle 21, a $N_2$ (nitrogen) gas supply unit 22 and a liquid end tank 23.

The bottle 21 is an airtight bottle configured to store a resist liquid, and is connected to one end of each of pipes 101 and 102. The other end of the pipe 101 is connected to the $N_2$ gas supply unit 22 via a valve V11. The $N_2$ gas is a gas for pressurizing the inside of the bottle 21. The other end of the pipe 102 extends to the inside of the liquid end tank 23 via a valve V12.

The liquid end tank 23 is provided to stably supply the resist to the downstream side, and is provided with a liquid surface sensor (not illustrated) to perform management of a liquid volume. One end of a drainage pipe 111 is connected to the top of the liquid end tank 23, and the other end of the drainage pipe 111 is connected to a drainage passage placed under an atmosphere via a valve V13. One end of a pipe 103 is connected to the bottom of the liquid end tank 23, and the other end of the pipe 103 is connected to the filter unit 3 via a valve V14. The valve V14 is a valve at a primary side (resist supply source side) of the filter unit 3.

Figure 2:
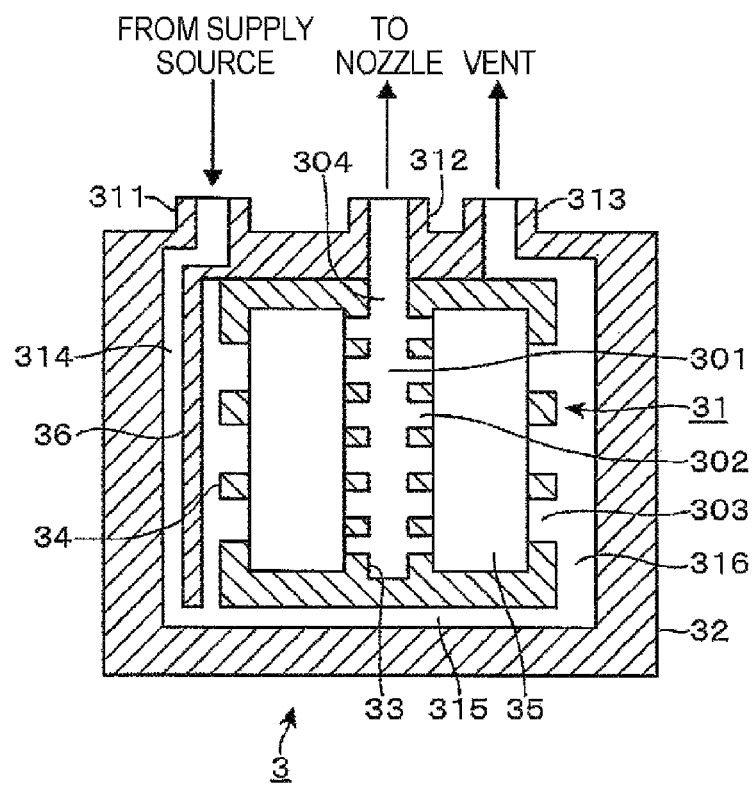
FIG. 2 is a cross-sectional side view illustrating a filter unit provided in the resist coating apparatus.

The filter unit 3 collects foreign substances (e.g., particles) included in the resist that flows from the upstream side to the downstream side, to remove them from the resist liquid. The configuration of the filter unit 3 will be simply described with reference to the cross-sectional side view of FIG. 2. The filter unit 3 includes a cartridge 31 and a capsule 32 that surrounds the cartridge 31. The cartridge 31 includes an upright inner cylinder part 33, a holding unit 34 that covers the circumference of the inner cylinder part 33, and a filtration member 35 that is provided to surround the side circumference of the inner cylinder part 33 within the holding unit 34. In the drawing, the reference numeral 301 indicates a flow path within the inner cylinder part 33, the reference numeral 302 indicates an aperture provided at the side wall of the inner cylinder part 33, the reference numeral 303 indicates an aperture provided at the side wall of the holding unit 34, and the reference numeral 304 indicates an aperture provided in the top of the holding unit 34. The flow path 301 and the apertures 302 and 304 are communicated with each other. The filtration member 35 is provided between the apertures 302 and 303 to block them from each other.

Ports 311, 312, and 313 are provided at the top side of the capsule 32. The port 311 is a resist introducing port connected to the pipe 103. A guide member 36 is provided within the capsule 32, and the resist introduced from the resist introducing port 311 passes through the bottom portion of the capsule 32 by means of the guide member 36 and then is guided upwardly along the guide member 36. In the drawing, the reference numeral 314 indicates a flow path that is formed by the guide member 36 and the inner wall of the capsule 32 and is directed downwardly from the resist introducing port 311. In the drawing, the reference numeral 315 indicates a flow path that is formed at the lower portion of the cartridge 31 to be horizontally widened from the flow path 314, and the reference numeral 316 indicates a flow path that extends upwardly from the flow path 315 along the outer wall of the holding unit 34.

The port 312 is an external supply port configured to supply the filtered resist to the outside, and is opened at the aperture 304 of the cartridge 31. The port 313 is a venting port, and is opened at the flow path 316. The ports 311, 312, and 313 are configured to be detachably connected to pipes 103, 104, and 131, respectively.

Figure 3:
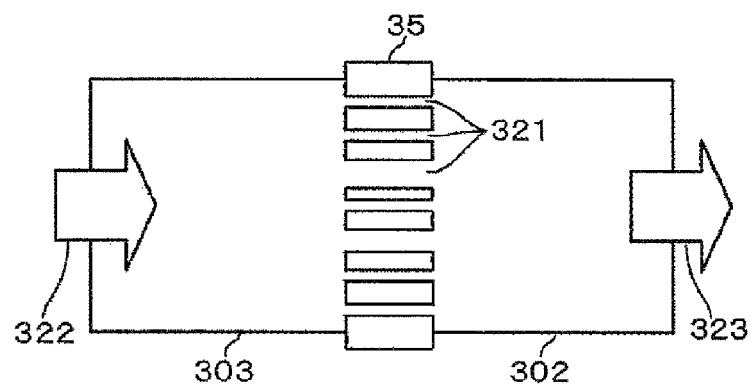
FIG. 3 is a schematic view illustrating a filtration member provided in the filter unit.

Hereinafter, besides the filtration member 35, the problem in the filter wetting process as described in the background art section will be complementarily described. The filtration member 35 is configured by bending a film member made of, for example, nonwoven fabric. The filtration member 35 is dried at the time of attaching the filter unit 3 to the resist coating apparatus 1, but is immersed in the resist when used. The filtration member 35 includes a plurality of fine holes 321. FIG. 3 schematically illustrates the holes 321. In the drawing, an arrow 322 and an arrow 323 indicate a resist that is reaching toward the filtration member 35, and a resist that is passed through the filtration member 35, respectively. When the foreign substances included in the resist at the upstream side are larger than the holes 321, they are directly collected by the filtration member 35. Even though the foreign substances are smaller than the holes 321, they are collected by the filtration member 35 through known collection methods, such as the blocking collection, inertial collection, diffusion collection and electrostatic attraction collection, and are suppressed from flowing out to the downstream side of the filtration member 35. However, the sizes of the holes 321 are variable, and thus it may be difficult to penetrate the resist into the holes 321 according to the sizes of the holes 321.

That is, even if the resist is supplied to the filter unit 3 to perform the filter wetting, there may occur an area of the filtration member 35 that is not immersed in the resist. When the resist coating process is performed in this state, the resist at the upstream side flows through the filtration member 35 only in a limited range, and then supplied to the downstream side of the filtration member 35. Then, the blocking collection, the inertial collection, the diffusion collection, and the electrostatic attraction collection may not be sufficiently performed. In order to avoid this situation, a negative pressure deaeration process and an atmospheric opening process which will be described later are performed in the filter wetting process using the resist coating apparatus 1. The negative pressure refers to a pressure which is lower than an atmospheric pressure.

Referring back to FIG. 1, the piping system will be continuously described. One end of the pipe 104 is connected to the external supply port 312 of the filter unit 3, and the other end of the pipe 104 is connected to the wall surface of a trap tank 24 via a valve V15. One end of a drainage pipe 112 is connected to the top of the trap tank 24, and the other end of the drainage pipe 112 is connected to a drainage passage placed under an atmosphere via a valve V16. In the drawing, the reference number V16 indicates the valve interposed in the drainage pipe 112. The trap tank 24 serves to collect the bubbles in the resist and remove them through the drainage pipe 112.

One end of the pipe 105 is connected to the bottom of the trap tank 24, and the other end of the pipe 105 is connected to the upstream side of the pump 25 via a valve V17. As for the pump 25, for example, a pump with a structure that reflects suction-pressurization from the outside of the pump is employed. Examples thereof may include a pneumatic pump such as a diaphragm pump. A diaphragm is deformed by an internal pressure of a space provided within the pump 25 to perform expansion and contraction of a resist flow path constituted by the diaphragm. By the expansion of the flow path, the upstream side of the pump 25, that is, a secondary side (nozzle side) of the filter unit 3 is decompressed to form a negative pressure atmosphere, and as result, a suctioning process of the resist toward the flow path is performed. By the contraction of the flow path, the resist is ejected from the flow path to the downstream side. In the drawing, the reference numeral 121 indicates a pipe configured to supply air in order to pressurize the space, and the reference numeral 122 indicates a pipe configured to exhaust the air from the space in order to decompress the space. In the drawing, reference numerals V21 and V22 indicate valves interposed in the pipes 121 and 122, respectively.

One end of a pipe 106 is connected to the pump 25 via a valve V18, and the other end of the pipe 106 is connected to the wall surface of a trap tank 26. The trap tank 26 is provided to collect and remove bubbles in the same manner as in the trap tank 24. One end of a drainage pipe 113 is connected to the top of the trap tank 26, and the other end of the drainage pipe 113 is connected to the drainage passage via a valve V19. One end of a pipe 107 is connected to the bottom of the trap tank 26, and the other end of the pipe 107 is connected to the nozzle 14 via a valve V23.

Subsequently, the decompressing unit 4 will be described. The decompressing unit 4 is constituted by pipes (including exhaust pipes), trap tanks 41 and 42, a vacuum trap tank 43, an exhaust passage 136 and respective valves which will be described later. One end of the pipe 131 is connected to the venting port 313 of the filter unit 3. The other end of the pipe 131 is connected to the bottom of the trap tank 41 via a valve V41 which is a venting valve. At the time of the negative pressure deaeration process, the inside of the trap tank 41 is decompressed into a negative pressure atmosphere while the resist sucked from the filter unit 3 is trapped by the trap tank 41. One end of a drainage pipe 114 is connected to the bottom of the trap tank 41, and the other end of the drainage pipe 114 is connected to the drainage passage via a valve V42. One end of an exhaust pipe 132 is connected to the top of the trap tank 41, and the other end of the exhaust pipe 132 is connected to the vacuum trap tank 43 via a valve V43.

One end of a pipe 133 is connected to a preceding side of a valve V15 in the pipe 104 connected to the external supply port 312 of the filter unit 3. The other end of the pipe 133 is connected to the bottom of a trap tank 42 via a valve V44 that constitutes secondary side valves of the filter unit 3. At the time of the negative pressure deaeration process, the inside of the trap tank 42 is decompressed into a negative pressure atmosphere while the resist sucked from the filter unit 3 is trapped by the trap tank 42, in the same manner as in the trap tank 41. One end of a drainage pipe 115 that is configured to remove the resist stored in the trap tank 42 by the drainage passage is connected to the bottom of the trap tank 42. The other end of the drainage pipe 115 is connected to the drainage passage via a valve V45. One end of an exhaust pipe 134 is connected to the top of the trap tank 42, and the other end of the exhaust pipe 134 is connected to the vacuum trap tank 43 via a valve V46.

The vacuum trap tank 43 serves to more securely suppress the resist from flowing into the exhaust passage 136. An inner space 44 provided in the vacuum trap tank 43 is decompressed while storing, therewithin, the resist leaked from the trap tanks 41 and 42 through the exhaust pipes 132 and 134. A liquid level meter 45 is provided in the inner space 44, which detects a liquid level of the leaked resist to output a predetermined signal to a control unit 10 to be described later. One end of an exhaust pipe 135 is connected to the top of the vacuum trap tank 43, and the other end of the exhaust pipe 135 is connected to an exhaustion volume adjusting unit 46 that is interposed in the exhaust passage 136 for air via a valve V47. The exhaust flow rate of exhaust pipe 135 is adjusted to be an appropriate value by the exhaustion volume adjusting unit 46. In the drawing, the reference numeral 47 indicates a vacuum gauge, which outputs a signal to the control unit 10 according to the degree of vacuum within the exhaust pipe 135.

The resist coating apparatus 1 includes the control unit 10. The control unit 10 includes, for example, a program, a CPU, and a bus. In the program, commands (respective steps) are incorporated such that a control signal is output from the control unit 10 to the respective units of the resist coating apparatus 1, and the following processes are performed. The program is stored in a recording unit such as a computer storage medium, for example, a flexible disk, a compact disk, a hard disk, or an MO (magneto-optical disk) and installed in a main memory. Examples of the program may include programs for executing rotation of the spin chuck 11, operation of the pump 25 by opening/closing of the respective valves, through-flow of a resist toward the downstream side, and a negative pressure deaeration process. The respective programs perform these operations through the CPU.

The control unit 10 includes an operation unit (not illustrated). When an operator of the resist coating apparatus 1 performs a predetermined operation through the operation unit, a control signal is output to respective units of the resist coating apparatus 1 such that the filter wetting process may be automatically performed. Also, the control unit 10 monitors a signal transmitted from the vacuum gauge 47 and the liquid level meter 45, and outputs an alarm by an alarm generating unit (not illustrated) when detecting an error in the degree of vacuum, and leakage of a resist. The alarm is, for example, voice or screen display.

The above described filter wetting process includes an immersion process for introducing a resist into the filter unit 3 and immersing the filtration member 35 in the resist, a negative pressure deaeration process for deaerating the inside of the filter unit 3 to a negative pressure atmosphere, an atmospheric opening process for opening the inside of the filter unit 3 to atmosphere, and a through-flow process for flowing the resist from the primary side of the filter unit 3 toward the nozzle 14, and the respective processes are performed in the above described order. Hereinafter, the filter wetting process and the resist coating process which is performed after the filter wetting process will be described by corresponding FIGS. 4 to 11 that illustrate opened/closed states of the respective valves of the resist coating apparatus 1, to FIGS. 12 to 20 that illustrate the states where the resist flows through the inside of the filter unit 3. In FIGS. 4 to 11, the flow of the resist within the pipes is indicated by a bold line. FIGS. 13 to 20 also illustrate opened/closed states of the valves V14, V41, V15, and V44 connected to the respective ports 311 to 313.

Figure 12:
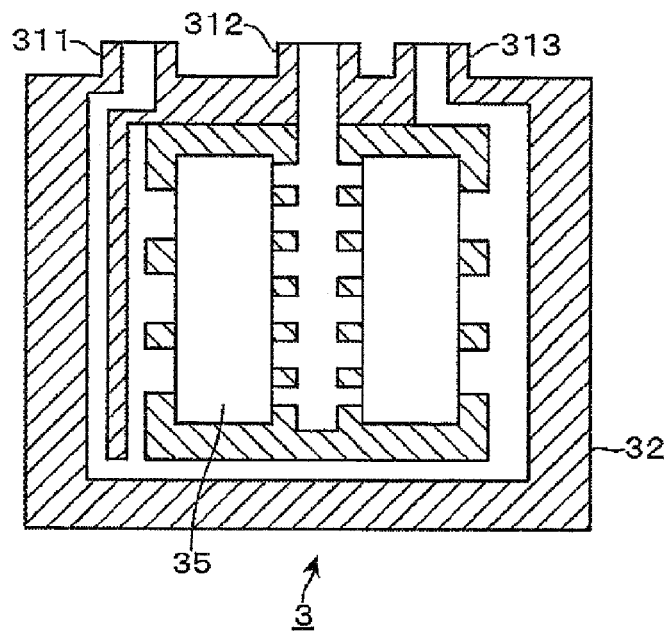
FIG. 12 is an explanatory view illustrating the appearance within the filter unit.

First, a new filter unit 3 illustrated in FIG. 12, which is placed in a dried state and has the filtration member 35 not immersed in a liquid, is prepared. The filter unit 3 is mounted in the resist coating apparatus 1 from which the old filter unit 3 illustrated in FIG. 1 has been removed. Specifically, the pipes 103, 104, and 131 are connected to the ports 311, 312, and 313 to constitute the resist coating apparatus 1 illustrated in FIG. 1. For example, the respective valves V11 to V47 are closed at this point of time.

Figure 4:
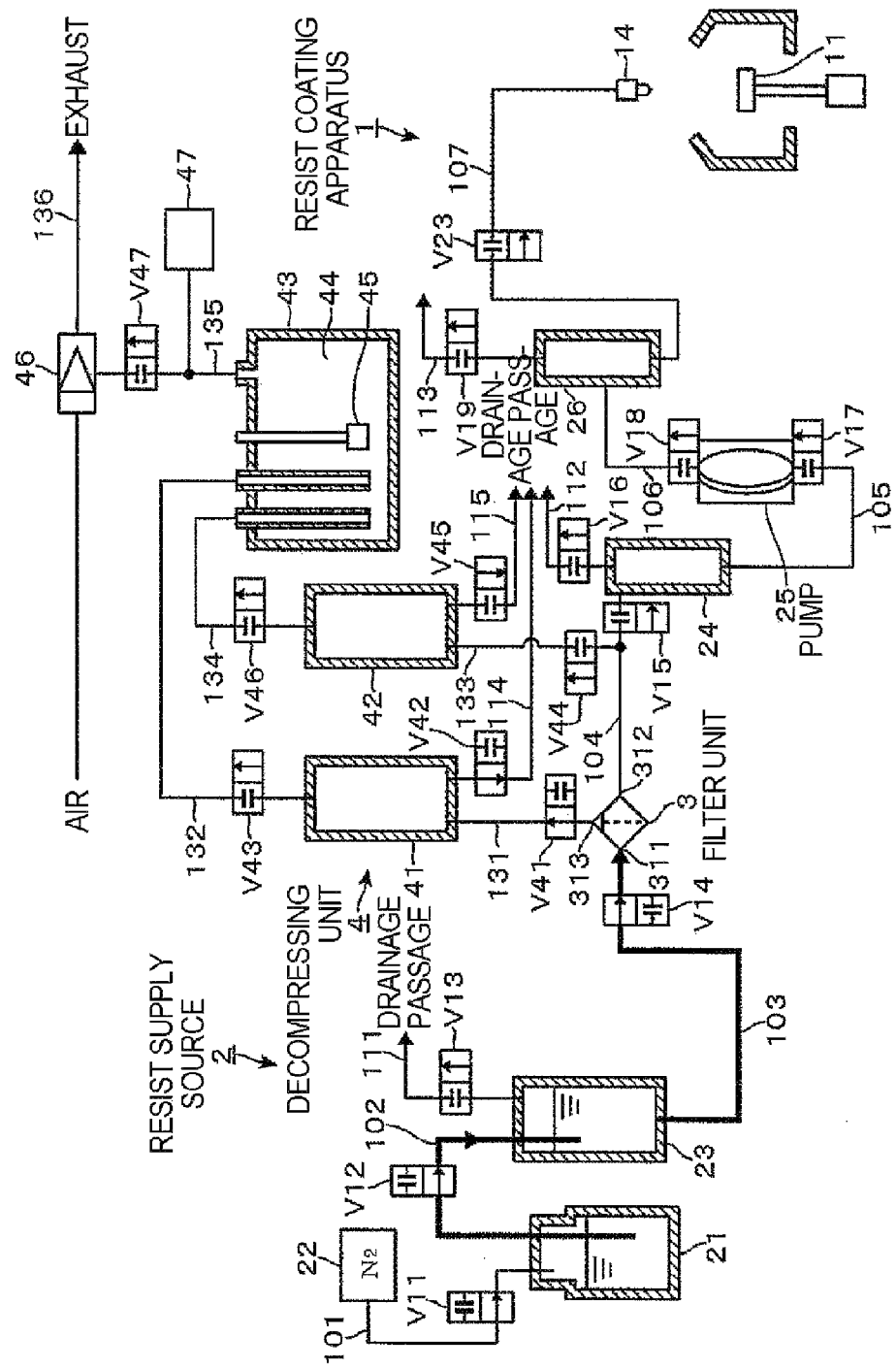
FIG. 4 is an operational view illustrating an opening/closing of a valve in the resist coating apparatus.
Figure 13:
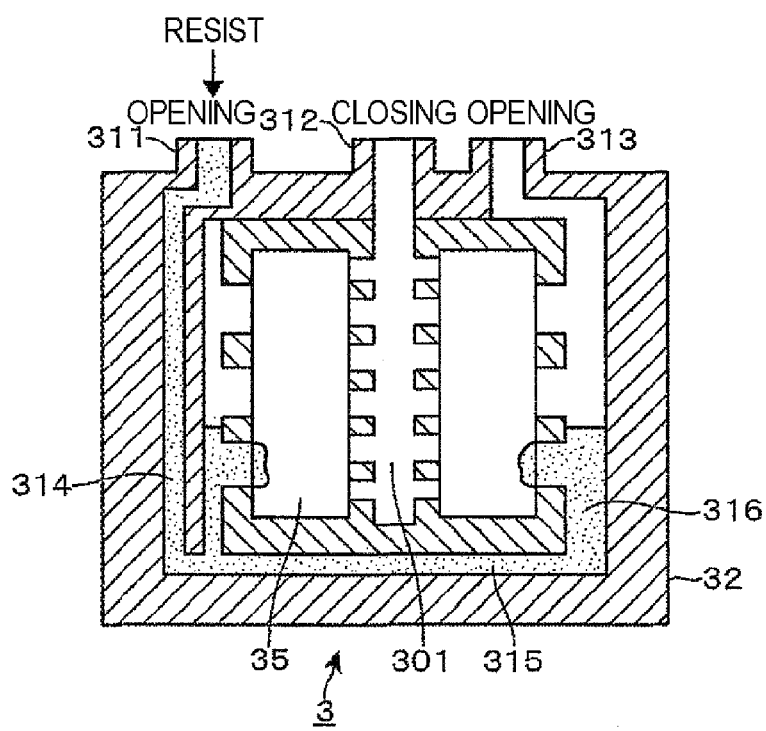
FIG. 13 is an explanatory view illustrating the appearance within the filter unit.
Figure 14:
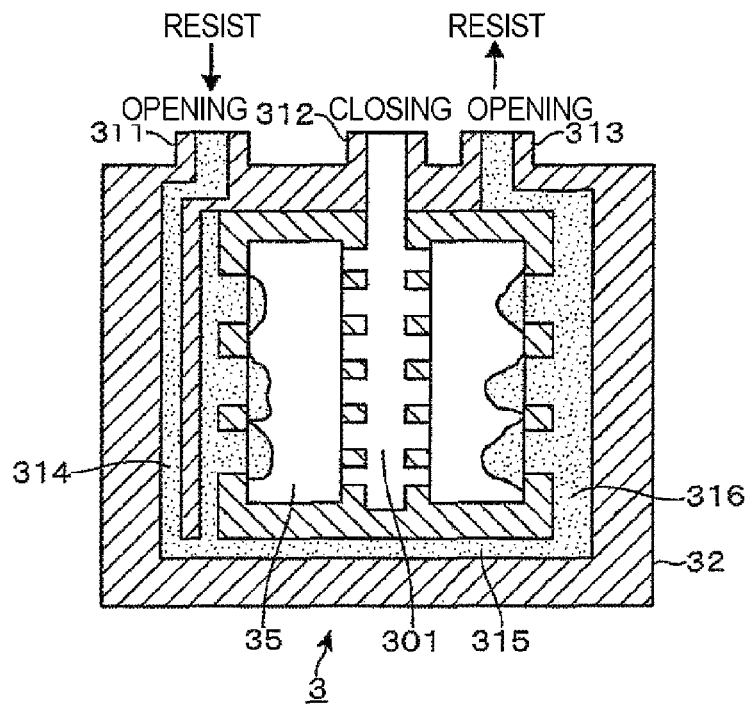
FIG. 14 is an explanatory view illustrating the appearance within the filter unit.

When the operator of the resist coating apparatus 1 performs a predetermined operation through the operation unit of the control unit 10, the valves V12, V14, V41 and V42 are opened, and paths extending from the bottle 21 to the drainage passage through the filter unit 3 and the trap tank 41 are opened to initiate the immersion process of the filter unit 3. The valve V11 is opened, the bottle 21 is supplied with $N_2$ gas, and its internal pressure is increased to flow the resist from the resist supply source 2 to the filter unit 3, as illustrated in FIG. 4. The resist supplied to the filter unit 3 is, as illustrated in FIG. 13, supplied from the resist introducing port 311 to the flow paths 314, 315, and 316 within the capsule 32 and then supplied to the filtration member 35. As illustrated in FIG. 14, the resist is further supplied to the flow path 316, fills the flow path 316, and flows to the drainage passage through the venting port 313, while gradually penetrating the filtration member 35 from the flow path 316.

Figure 5:
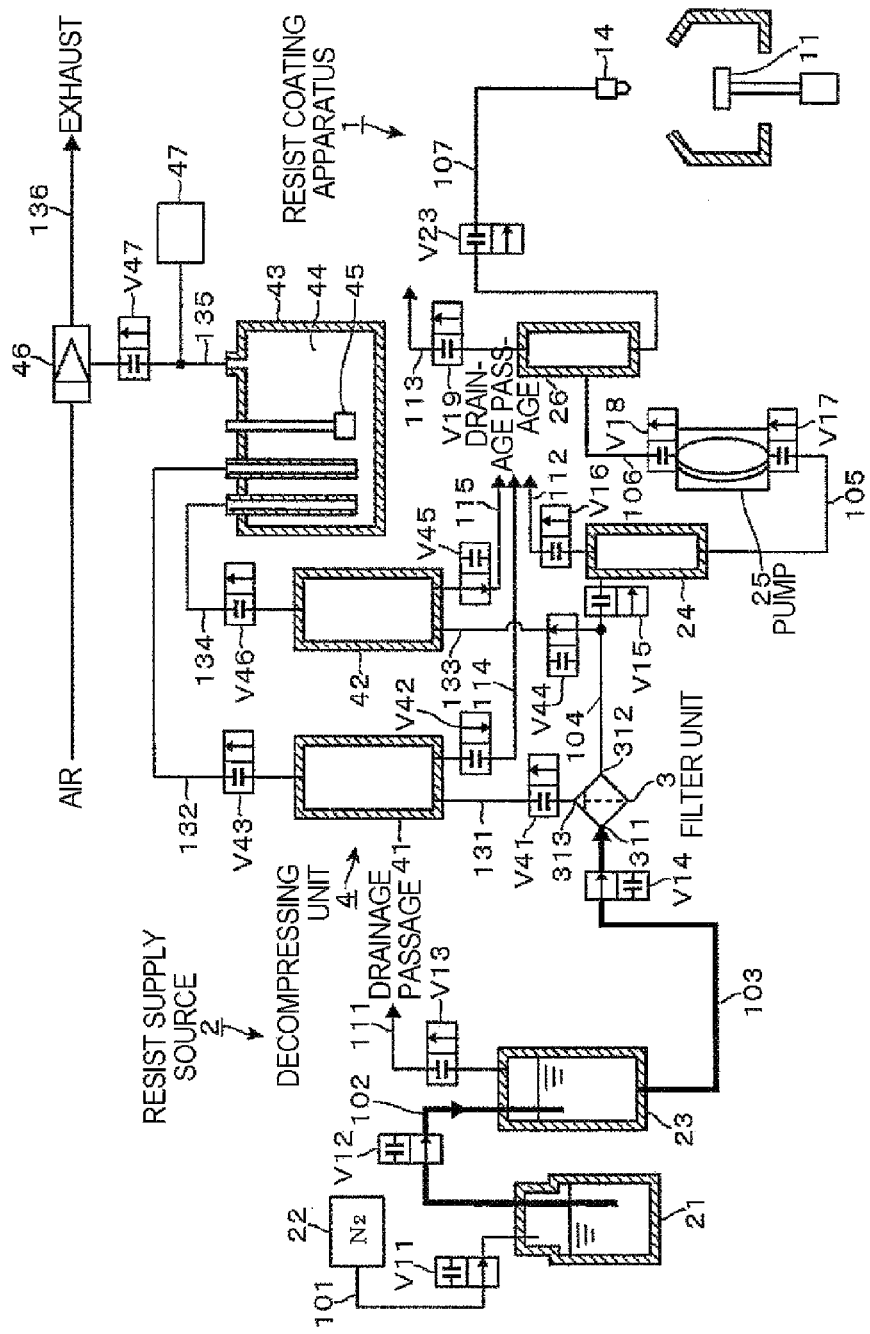
FIG. 5 is an operational view illustrating an opening/closing of a valve in the resist coating apparatus.
Figure 15:
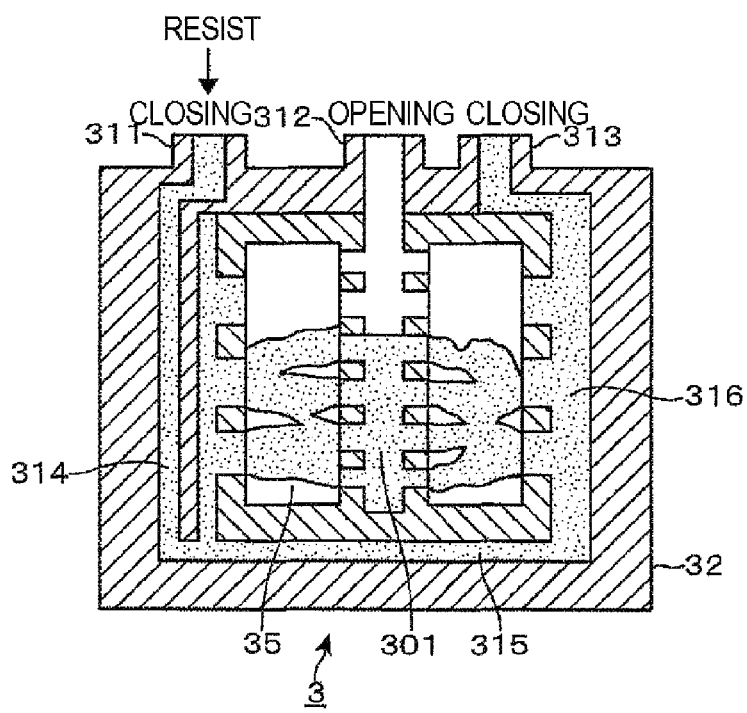
FIG. 15 is an explanatory view illustrating the appearance within the filter unit.
Figure 16:
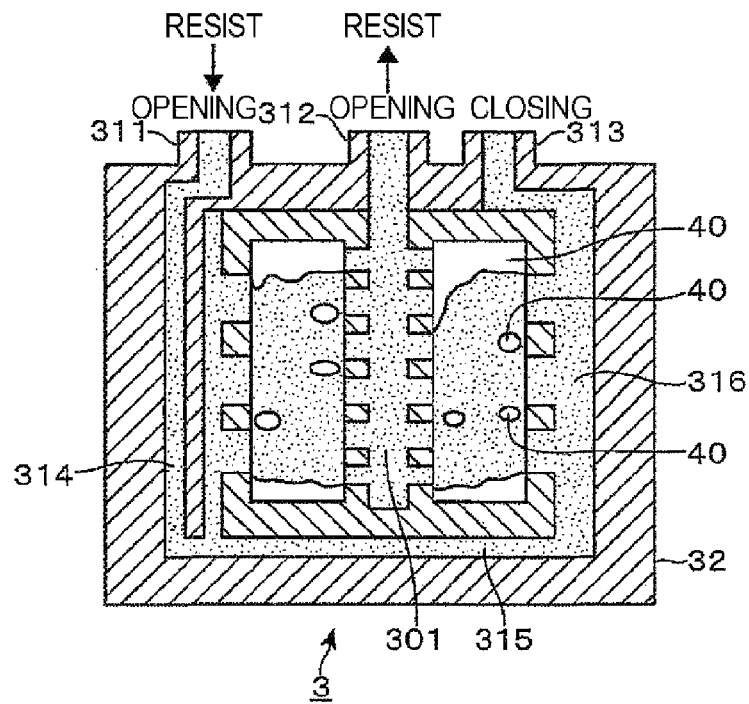
FIG. 16 is an explanatory view illustrating the appearance within the filter unit.
Figure 17:
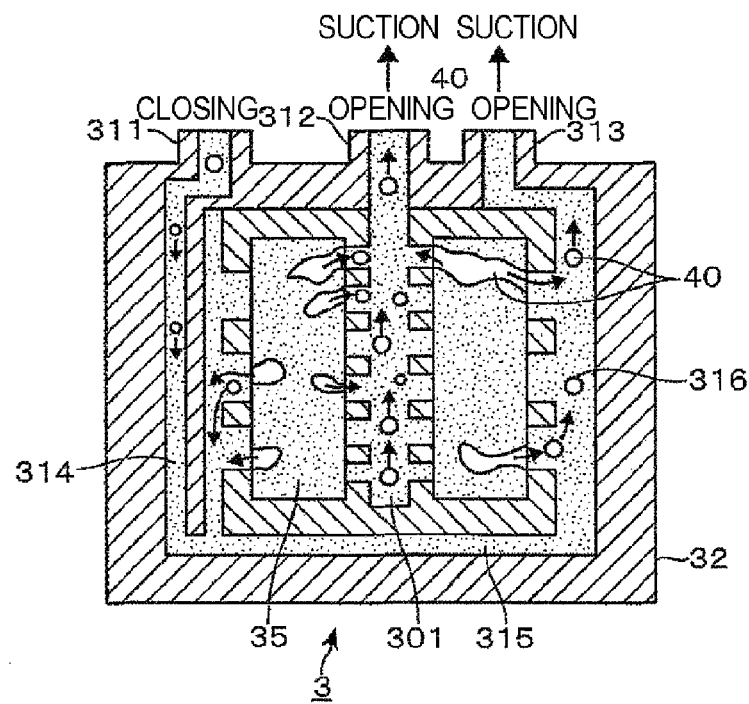
FIG. 17 is an explanatory view illustrating the appearance within the filter unit.

When a predetermined time is passed after the immersion process is initiated, the valves V41 and V42 are closed, and the path extending from the venting port 313 of the filter unit 3 to the drainage passage through the trap tank 41 is closed. Simultaneously with the closing of the path, as illustrated in FIG. 5, the valves V44 and V45 are opened, and the path extending from the external supply port 312 of the filter unit 3 to the drainage passage through the trap tank 42 is opened. This, as illustrated in FIG. 15, allows the resist to flow toward the flow path 301 at the inside of the flow path 316 through the filtration member 35, thereby further immersing the filtration member 35. The resist continuously flows, while filling the flow path 301 and being discharged from the external supply port 312 to the drainage passage through the trap tank 42. Here, an area of the filtration member 35 that does not face the aperture 303 is hardly in contact with the resist unlike an area that faces the aperture 303, and as described above, the resist does not uniformly penetrate the filtration member 35. Thus, as illustrated in FIG. 16, there exist some portions in the filtration member 35 which are not immersed in the resist, that is, portions where bubbles 40 remain.

Figure 6:
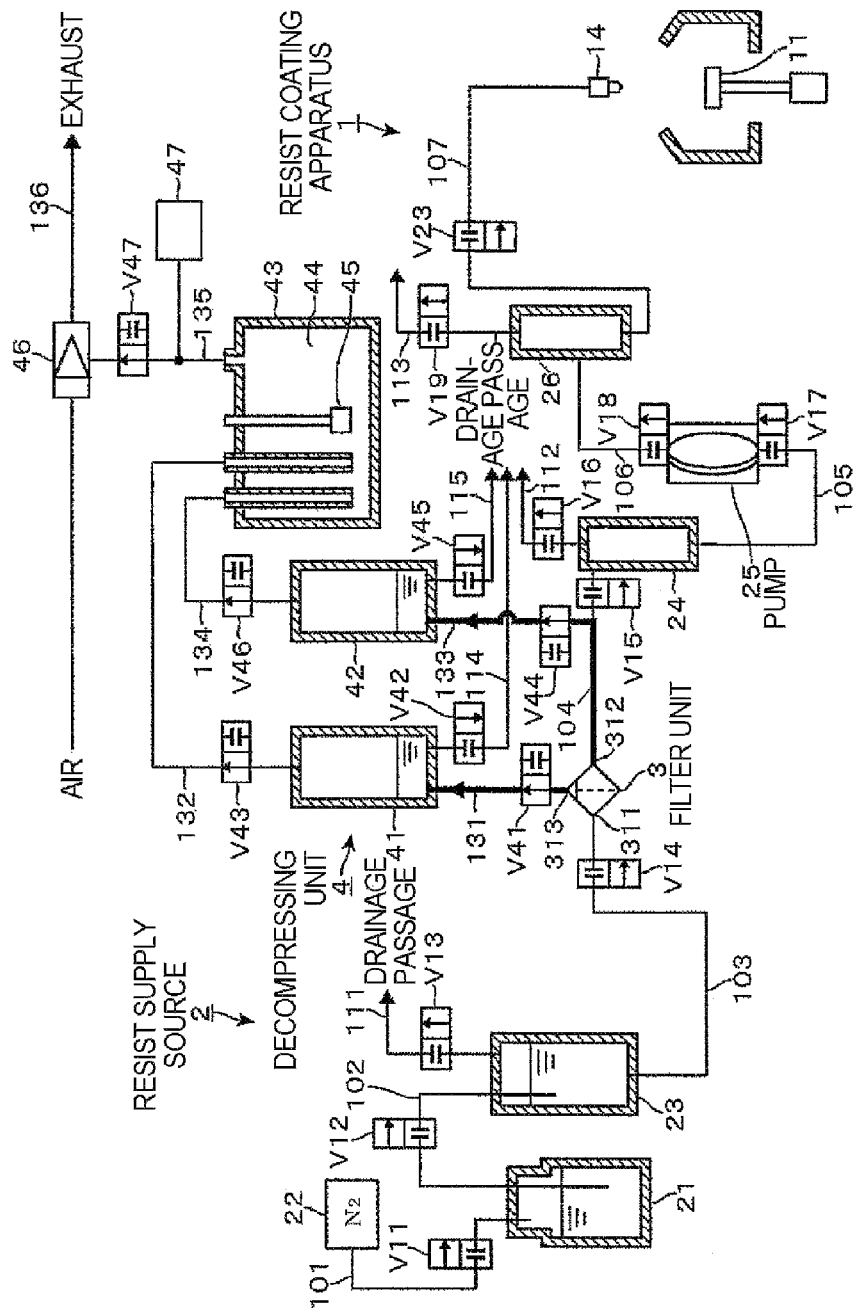
FIG. 6 is an operational view illustrating an opening/closing of a valve in the resist coating apparatus.

When a predetermined time is passed after the immersion process is initiated, the valves V11, V12, and V14 are closed, the supply of $N_2$ gas to the bottle 21 is stopped, and the path extending from the bottle 21 to the filter unit 3 is closed to finish the immersion process. Simultaneously with this, the valve V45 is closed, and the path extending from the trap tank 42 to the drainage passage is closed. As illustrated in FIG. 6, valves V41, V43, V44, V46, and V47 are opened, and the path extending from the venting port 313 of the filter unit 3 to the exhaust passage 136 through the trap tank 41, and the vacuum trap tank 43, and the path extending from the external supply port 312 of the filter unit 3 to the exhaust passage 136 through the trap tank 42 and the vacuum trap tank 43 are opened. This initiates the negative pressure deaeration process, and inside of the capsule 32 of the filter unit 3 is sucked and decompressed.

Figure 18:
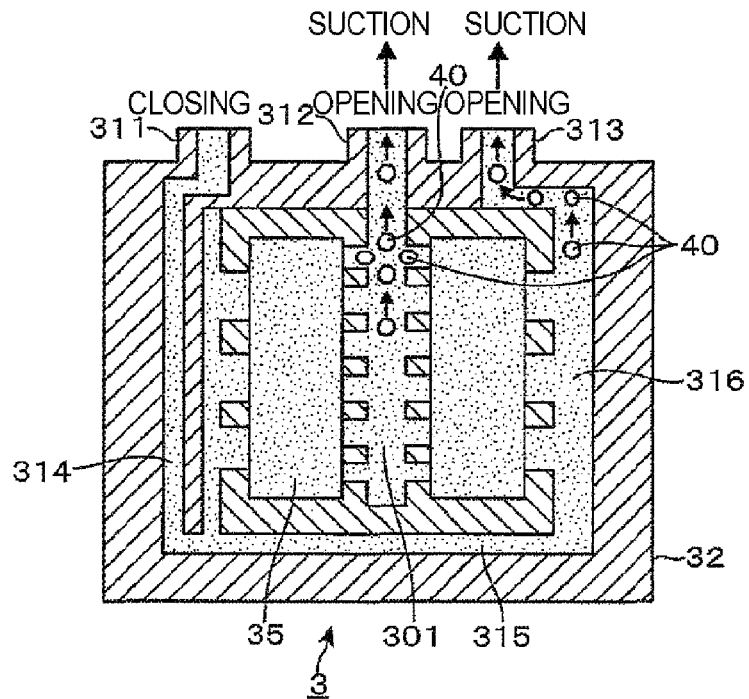
FIG. 18 is an explanatory view illustrating the appearance within the filter unit.

The inside of the capsule 32 is decompressed into a negative pressure atmosphere, and is maintained at, for example, −51 kPa to −80 kPa. In this example, it is maintained at −80 kPa (−80000 Pa). The state within the filter unit 3 at this time will be described using FIG. 17. The volume of the bubbles 40 included in the resist is increased, and the buoyancy with respect to the resist is increased. While the resist is sucked from the ports 312 and 313 in this manner, the flow of the resist occurs within the filter unit 3. The flow of the resist is caused by not only a suctioning force acting on the resist, but also by contraction of the inside of the capsule 32 through formation of the negative pressure atmosphere, as illustrated in an evaluation test to be described later. By the flow of the resist, capillarity of the resist is facilitated in the filtration member 35, the resist penetrates the flow path of the filtration member 35 which has been accumulated with bubbles 40 so far, and the bubbles 40 are drawn from the filtration member 35. As illustrated in FIG. 18, the drawn bubbles 40 gather, due to their increasing buoyancy, toward the ports 312, 313 where a suctioning process is performed. In this manner, the bubbles 40 are removed from the filtration member 35.

Figure 7:
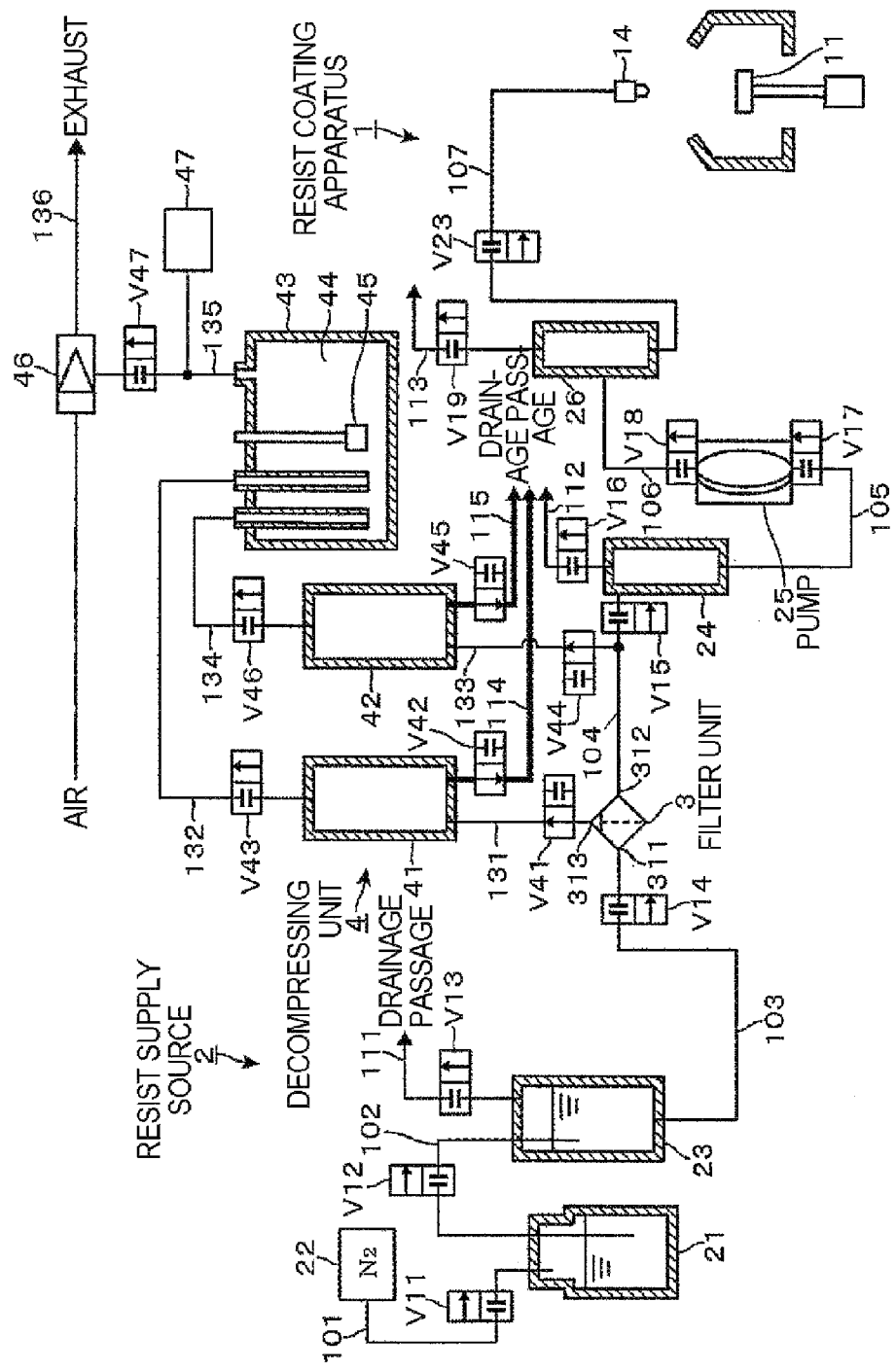
FIG. 7 is an operational view illustrating an opening/closing of a valve in the resist coating apparatus.
Figure 19:
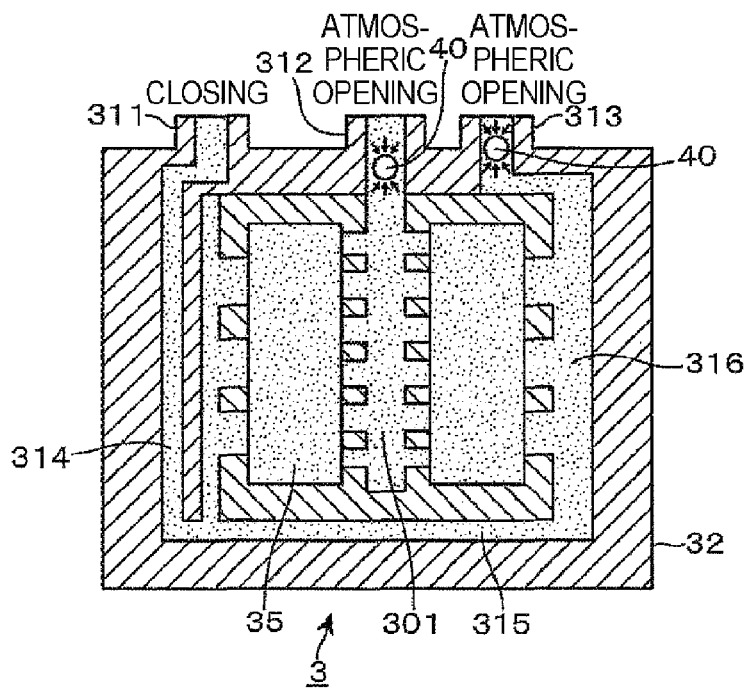
FIG. 19 is an explanatory view illustrating the appearance within the filter unit.
Figure 20:
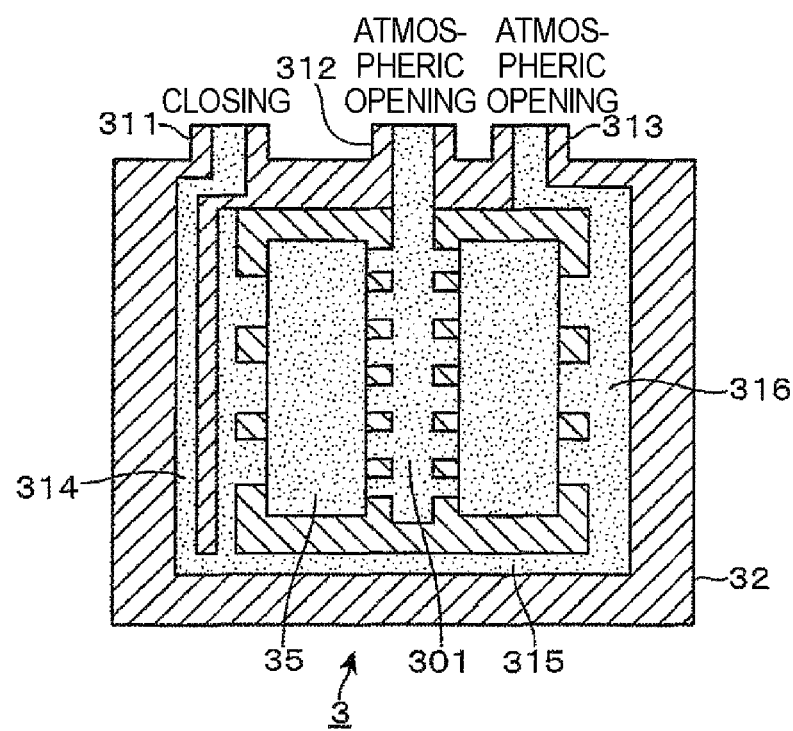
FIG. 20 is an explanatory view illustrating the appearance within the filter unit.

The resist sucked from the ports 312 and 313 at the time of the negative pressure deaeration process is collected by and stored in the trap tanks 41 and 42. When a predetermined time is passed after the negative pressure deaeration process is initiated, the valves V43, V46, and V47 are closed, and the paths extending from the trap tanks 41 and 42 to the exhaust passage 136 through the vacuum trap tank 43 are closed, thereby finishing the negative pressure deaeration process. Simultaneously with the closing of the paths, an atmospheric opening process where the valves V42 and V45 are opened is performed, and as illustrated in FIG. 7, and the paths extending from the filter unit 3 to the drainage passage placed under an atmosphere through the trap tanks 41 and 42 are opened. This increases the pressure within the filter unit 3 up to an atmospheric pressure, and increases the pressure that acts on the bubbles 40 drawn at the ports 312 and 313 as illustrated in FIG. 19. As a result, the bubbles 40 are dissolved in the resist as illustrated in FIG. 20. Simultaneously with the dissolution of the bubbles 40, the resist collected in the trap tanks 41 and 42 is discharged to the drainage passage.

Figure 8:
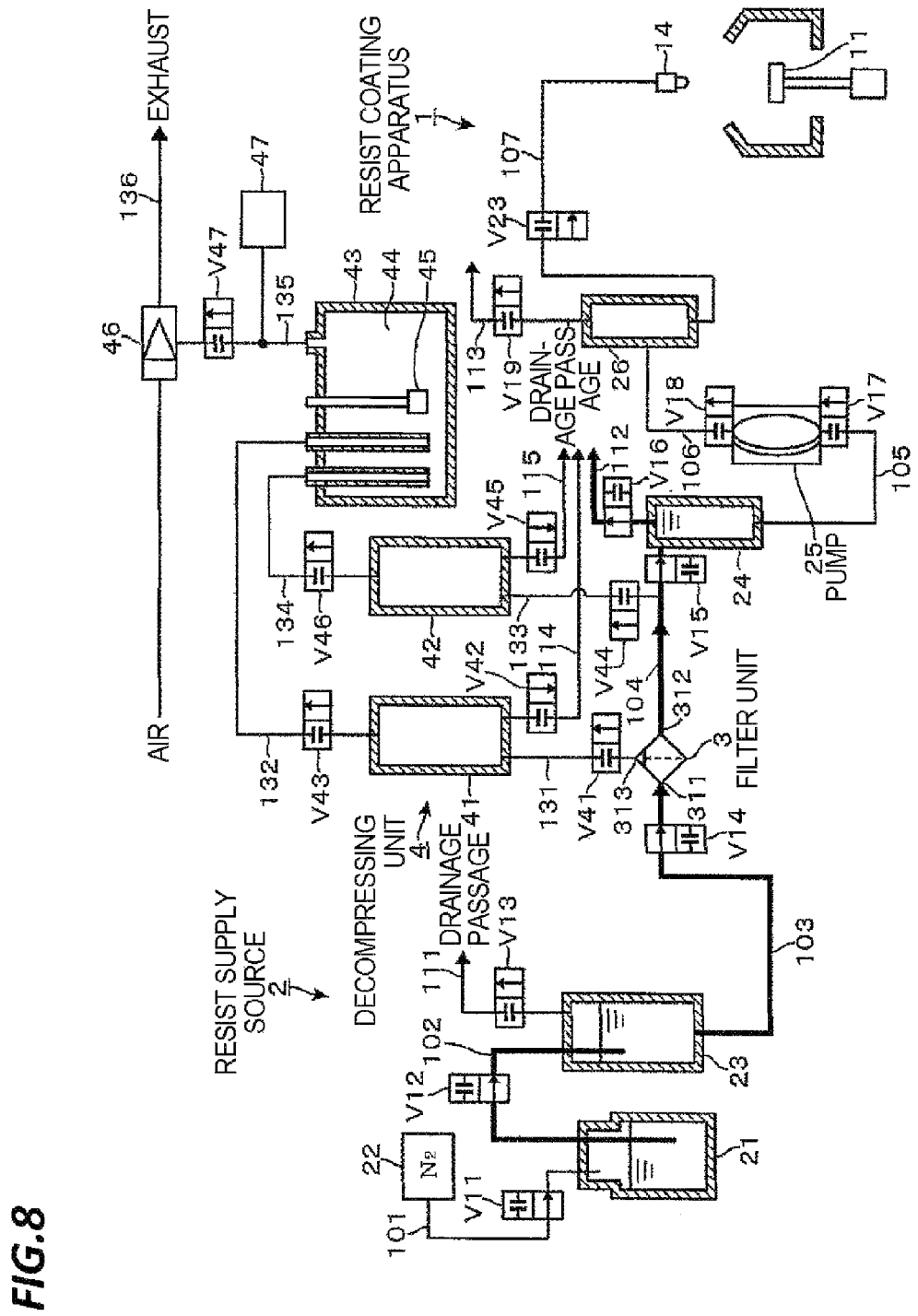
FIG. 8 is an operational view illustrating an opening/closing of a valve in the resist coating apparatus.

Subsequently, the valves V41, V42, V44, and V45 are closed, and the paths extending from the filter unit 3 to the drainage passage through the trap tanks 41 and 42 are closed. Then, the valves V12, V14, V15, and V16 are opened, and the path extending from the bottle 21 to the drainage passage through the liquid end tank 23, the filter unit 3, and the trap tank 24 is opened. The valve V11 is also opened to pressurize the bottle 21 by $N_2$ gas, and to initiate the through-flow process of the resist. As illustrated in FIG. 8, the resist is supplied from the resist supply source 2 to the path, and the resist that has the bubbles 40 dissolved therein within the filter unit 3 is washed away to the outside of the filter unit 3, and is removed by the drainage passage via the trap tank 24. This suppresses the dissolved bubbles 40 from re-foaming and becoming particles.

Figure 9:
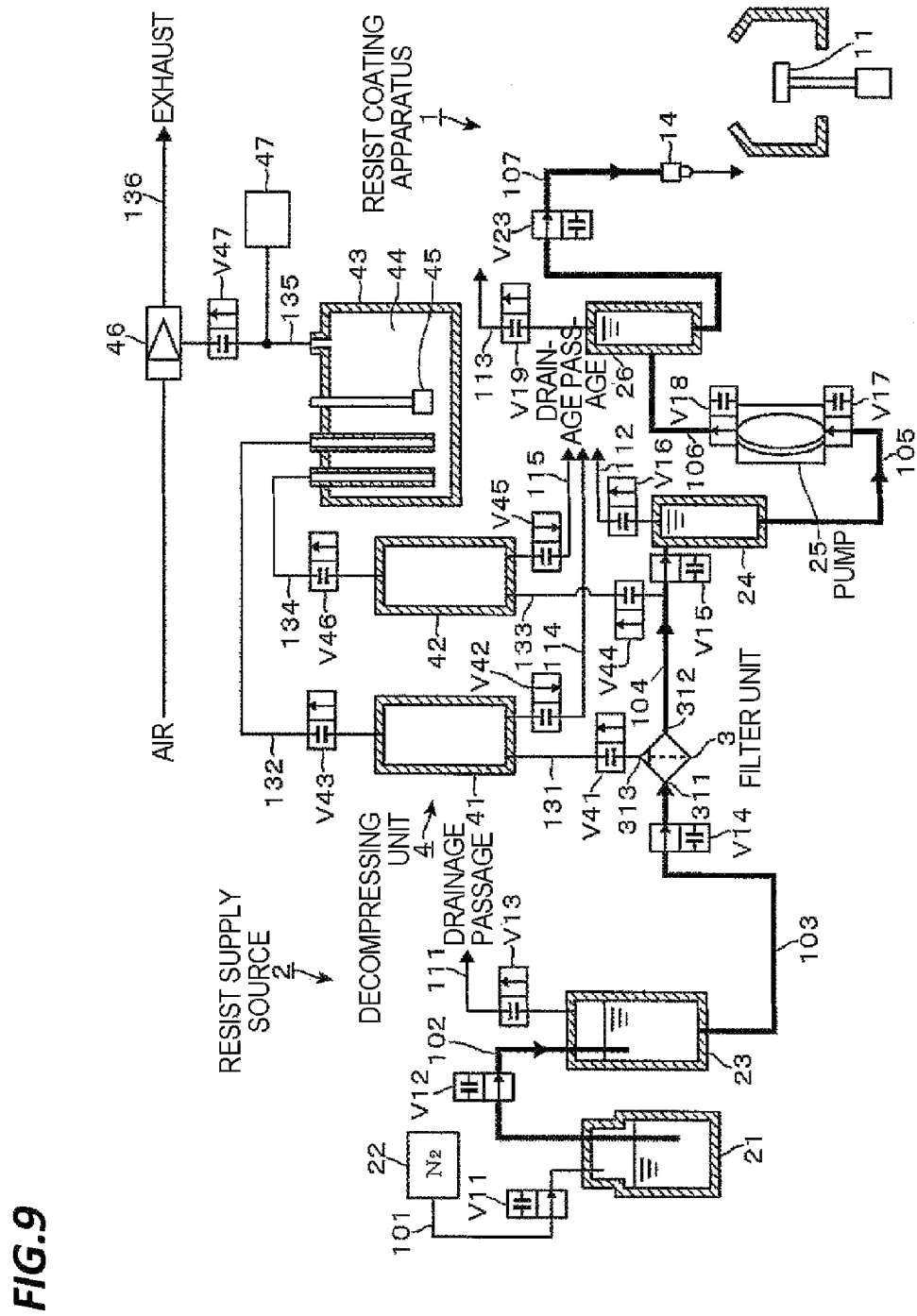
FIG. 9 is an operational view illustrating an opening/closing of a valve in the resist coating apparatus.

When a predetermined time passes after the through-flow process of the resist is initiated, the valve V16 is closed, and the path extending from the filter unit 3 to the drainage passage through the trap tank 24 is closed. Simultaneously with the closing of the path, the valves V17, V18, and V23 are opened, and as illustrated in FIG. 9, the path extending from the filter unit 3 to the nozzle 14 through the trap tank 24, the pump 25 and the trap tank 26 is opened. Then, the resist through-flow process is continued to eject the resist from the nozzle 14. By this, particles at the upstream side of the filter unit 3 are collected by the filter unit 3, and particles at the downstream side of the filter unit 3 are discharged together with the resist and removed from the piping system. During the through-flow of the resist, the valve V19 and the valve V23 are opened and closed at appropriate timings, and the resist is stored in the trap tank 26.

Figure 10:
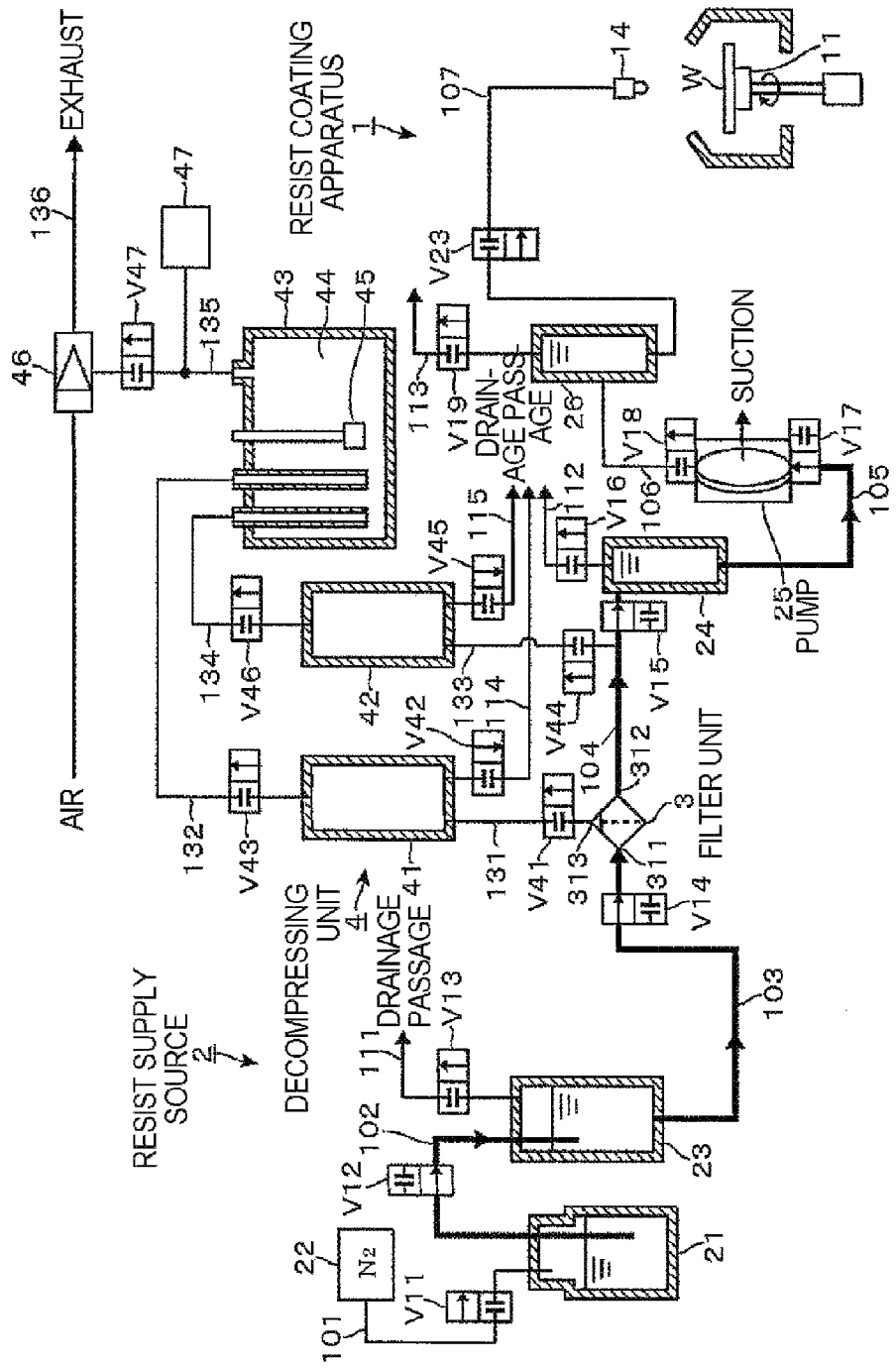
FIG. 10 is an operational view illustrating an opening/closing of a valve in the resist coating apparatus.

When a predetermined time passes after the through-flow process of the resist is initiated, the valve V11 is closed, the supply of $N_2$ gas to the bottle 21 is stopped, the valves V18, and V23 are closed, and the path extending from the pump 25 to the nozzle 14 is closed to finish the through-flow process of the resist. Then, the resist coating process is performed. First, the wafer W is held by the spin chuck 11 by means of a conveying mechanism (not illustrated) and is rotated around the vertical axis. As illustrated in FIG. 10, a suctioning process of the pump 25 is performed to decompress the secondary side of the filter unit 3. By this, the resist flows from the bottle 21 to the secondary side of the filter unit 3, and is stored in the pump 25. By the suctioning process, the pressure within the filter unit 3 and within the pipe is maintained in a range from −1 kPa to −50 kPa, for example, −1 kPa (−1000 Pa).

An object of the negative pressure deaeration process is to remove the bubbles 40 from the filtration member 35. Thus, the inside of the filter unit 3 is placed under a relatively high negative pressure atmosphere. However, when the negative pressure atmosphere is too high, components dissolved in the solvent of the resist may be deposited to change the property of the resist. At the time of the resist coating process, in order to suppress the degenerated resist from being supplied to the wafer W, and to suppress the deposited components from becoming particles, the suctioning amount of the pump 25 is controlled such that the pressure within the piping system that includes the filter unit 3 may be placed under a pressure atmosphere that is higher than the pressure within the filter unit 3 at the time of the negative pressure deaeration process. Also, at the time of the negative pressure deaeration process, the resist components may be deposited in the filter unit 3, but, thereafter, when the resist in the filter unit 3 is removed, the components are collected by the filtration member 35 or discharged together with the resist having the bubbles dissolved therein from the piping system without affecting the resist coating process.

Figure 11:
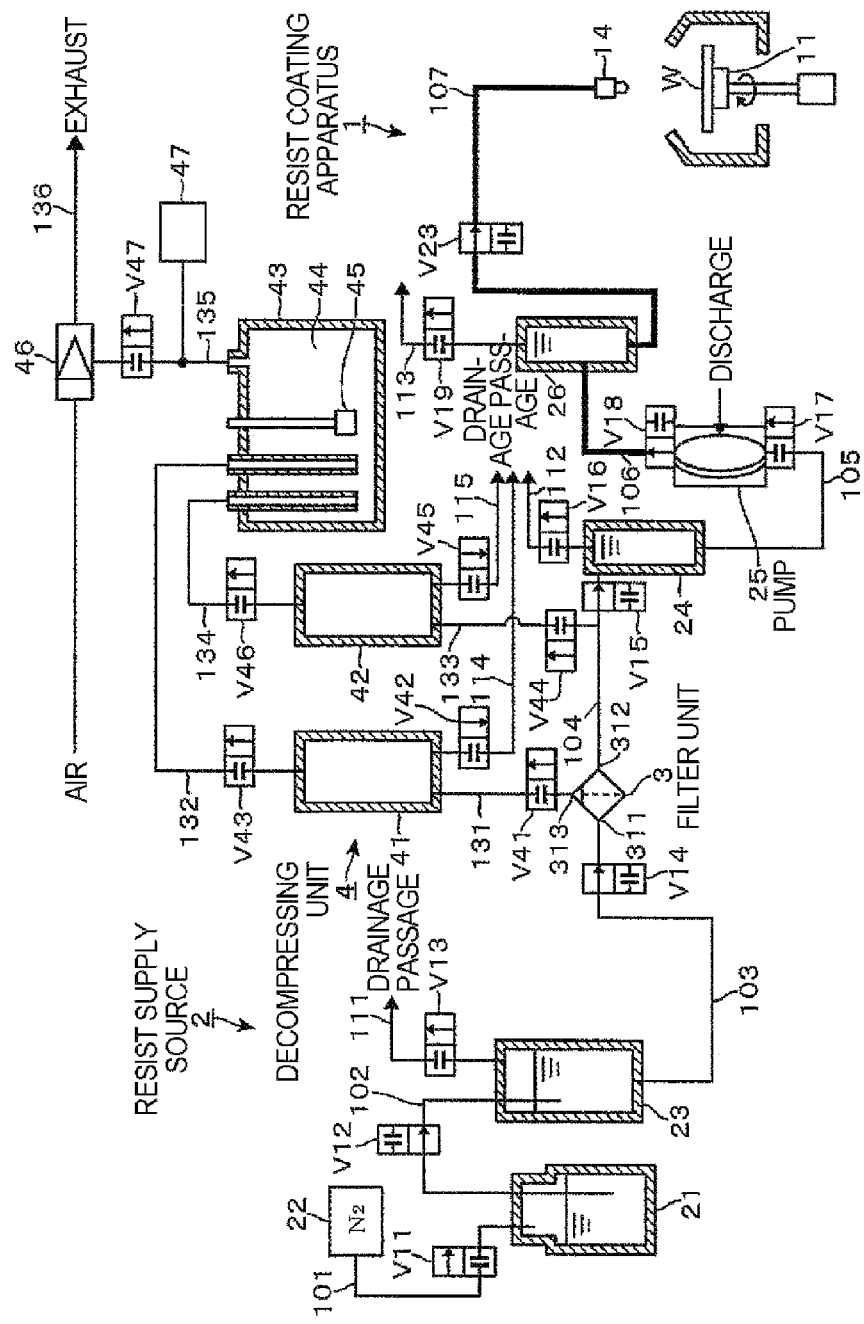
FIG. 11 is an operational view illustrating an opening/closing of a valve in the resist coating apparatus.

When the suctioning process of the pump 25 is finished by closing the valve V17, the valve V18 is opened, air is supplied to the pump 25, the pressure of the space configured to control the shape of the above described diaphragm is adjusted, and the valve V23 is opened to perform the ejection of the resist from the pump 25 to the nozzle 14. As illustrated in FIG. 11, the resist is supplied from the nozzle 14 to the center of the wafer W. The resist spreads toward the circumferential edge of the wafer W by a centrifugal force, and is coated on the entire surface of the wafer W. After the ejection, the valves V18 and V23 are closed to finish the resist coating process. While the pressurization of the pump 25 at the time of the resist coating process is performed step by step, the detailed description thereof is omitted.

Subsequently, a plurality of wafers W are conveyed to the resist coating apparatus 1, and the suctioning and ejecting processes of the pump 25 are repeated to coat the resist on the respective wafers W. During the repetitive coating processes, at appropriate timings, the path extending from the pump 25 to the venting port of the filter unit 3, the trap tank 41, and the drainage passage is opened, and the ejection of the pump 25 is performed to perform venting (gas discharge) of the filter unit 3. Valves of drainage pipes connected to the liquid end tank 23, the trap tank 24, and the trap tank 26 are opened at appropriate timings in the same manner, and venting is performed by the resist pumped from the bottle 21 or the pump 25.

In the resist coating apparatus 1, the resist is supplied into the capsule 32 of the filter unit 3, and the filtration member 35 is immersed in the resist. Then, the inside of the capsule 32 is sucked by the decompressing unit 4 to be decompressed into a negative pressure atmosphere at a pressure that is lower than a pressure of the negative pressure atmosphere at the time of the coating process to draw the bubbles included in the holes 321 of the filtration member 35. Then, the filter unit 3 is returned to the atmospheric pressure to dissolve the bubbles in the resist. When the process is performed in this manner, the bubbles may be quickly removed from the filtration member 35, and the bubbles that remain in the filter unit 3 may be reduced. Accordingly, in any case of newly starting the resist coating apparatus 1 and replacing of the filter unit 3, it is possible to shorten the start-up time of the resist coating apparatus 1 which is a required time during which the filter unit 3 is mounted in the resist coating apparatus 1 and immersed in the resist liquid so that the wafer W is processed. Also, the amount of the resist which is allowed to flow in the filter unit 3 until the start-up of the resist coating apparatus 1 may be reduced. As a result, it is possible to improve the processing efficiency by the resist coating apparatus 1, and reduce the cost required for the start-up.

Second Exemplary Embodiment

Figure 21:
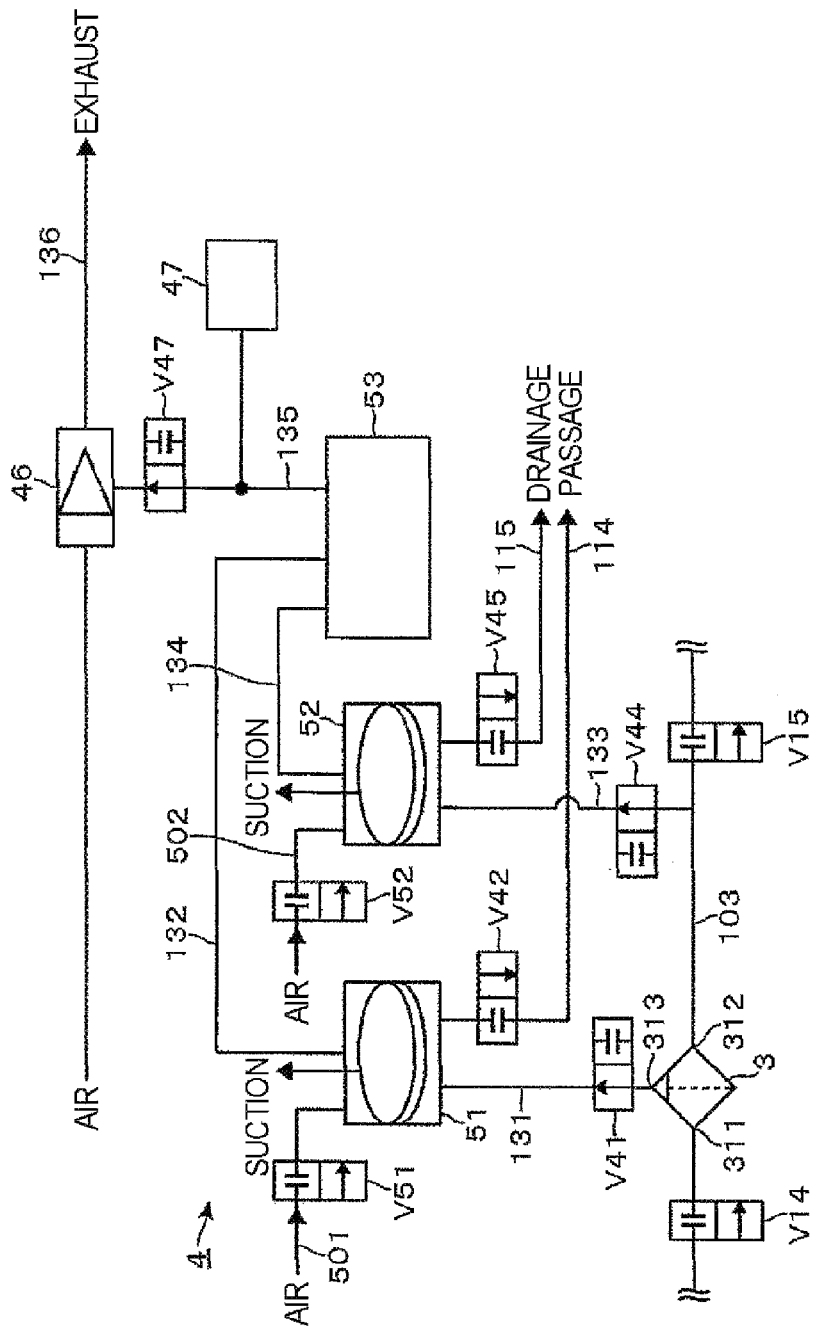
FIG. 21 is a view illustrating a piping diagram of a resist coating apparatus according to a second exemplary embodiment.

Referring to FIG. 21, a second exemplary embodiment will be described focusing on the difference from the first exemplary embodiment. In the second exemplary embodiment, the configuration of the decompressing unit 4 is different from that in the first exemplary embodiment. FIG. 21 illustrates the decompressing unit 4 and its peripheral configuration. The upstream side of the valve V14, and the downstream side of the valve V15 are configured in the same manner as in the first exemplary embodiment, and thus their illustration is omitted. In the second exemplary embodiment, instead of the trap tanks 41 and 42, pumps 51 and 52 are provided, respectively. The pumps 51 and 52 are connected to a vacuum tank 53 via the exhaust pipes 132 and 134. The vacuum tank 53 is configured in the same manner as the vacuum trap tank 43 of the first exemplary embodiment except that the liquid level meter 45 is not provided, and the vacuum tank 53 is connected to the exhaust passage 136 via the valve V47.

The pumps 51 and 52 are configured by, for example, the same diaphragm pumps as the pump 25. Also, air supply tubes 501 and 502 are connected to the pumps 51 and 52, respectively. The pumps 51 and 52 are driven by air supply from the air supply tubes 501, and 502, and exhaustion from the exhaust pipes 132 and 134, respectively. In the drawing, reference numerals V51 and V52 indicate valves interposed in the air supply tubes 501 and 502, respectively.

When the negative pressure deaeration process is performed, the valve V47 is opened, and the paths extending from the pumps 51 and 52 to the exhaust passage 136 through the vacuum tank 53 are placed in an opened state. Here, as illustrated in FIG. 21, the valves V14, V15, V42, V45, V51, and V52 are closed, and the path extending from the upstream side of the filter unit 3 to the trap tank 24 at the downstream side of the filter unit 3, and the paths extending from the pumps 51 and 52 to the drainage passage are placed in closed stated, respectively. The valves V41 and V44 are opened, and the paths extending from the venting port 313 and the external supply port 312 of the filter unit 3 to the pumps 51 and 52 are placed in opened states. In this manner, when opening/closing of the respective valves are controlled, and the pumps 51 and 52 perform a suctioning process, the inside of the filter unit 3 is sucked through the external supply port 312 and the venting port 313 such that the same negative pressure atmosphere as in the first exemplary embodiment may be formed within the filter unit 3.

Figure 22:
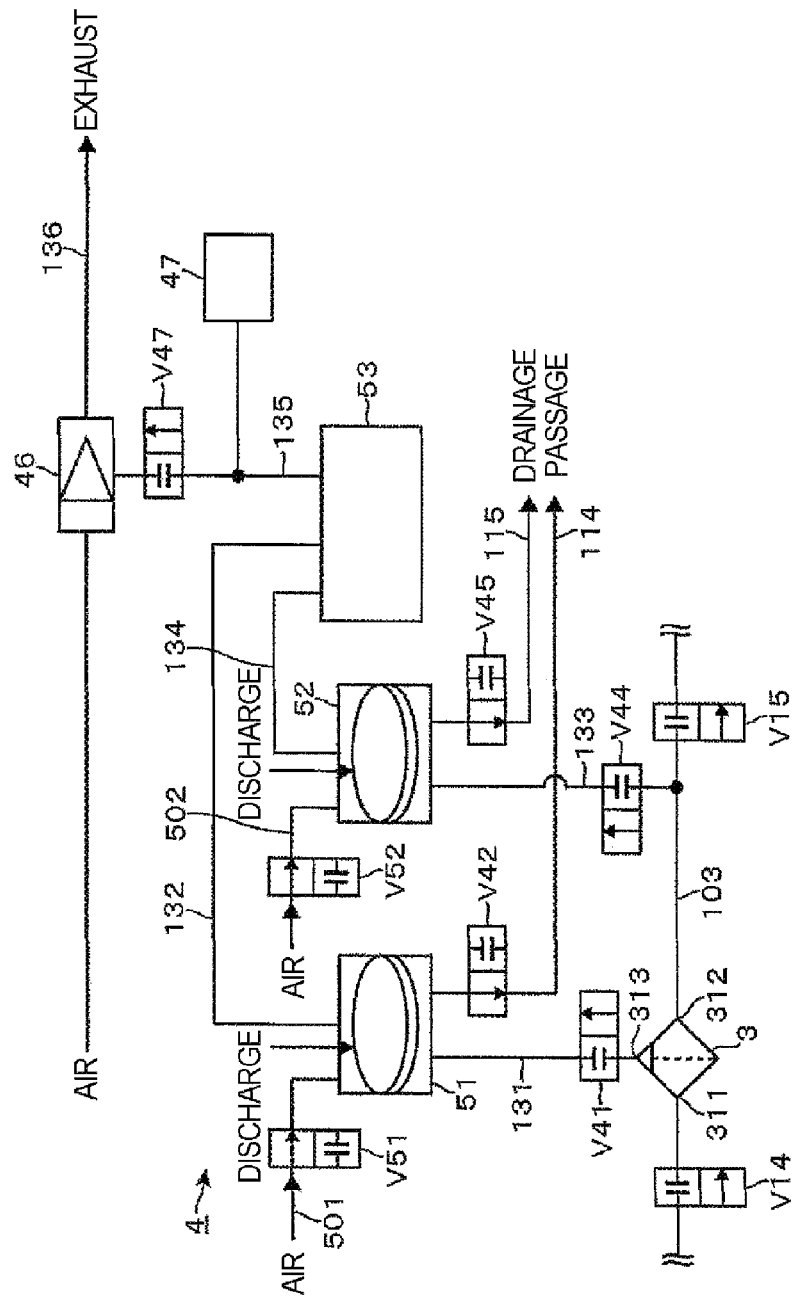
FIG. 22 is a view illustrating a piping diagram of a resist coating apparatus according to the second exemplary embodiment.

When the negative pressure deaeration process is finished, the valves V47, V41, and V44 are closed, and the paths extending from the filter unit 3 to the pumps 51 and 52, and the path extending from the vacuum tank 53 to the exhaust passage 136 are closed to finish the suctioning process of the pumps 51 and 52. Then, the valves V42 and V45 are opened, and the paths extending from the filter unit 3 to the drainage passage through the pumps 51 and 52 are opened to perform the above described atmospheric opening process. Then, as illustrated in FIG. 22, the valves V41 and V44 are closed, the paths extending from the filter unit 3 to the pumps 51, and 52 are closed, and the valves V51 and V52 are opened such that the pumps 51 and 52 perform ejection. Accordingly, the resist that remains in the pumps 51 and 52 is discharged to the drainage passage. In the second exemplary embodiment, respective processes except for the negative pressure deaeration process and the atmospheric opening process are performed in the same manner as in the first exemplary embodiment, and their detailed description is omitted. Through the second exemplary embodiment, the same effect as that in the first exemplary embodiment may be obtained.

Third Exemplary Embodiment

Figure 23:
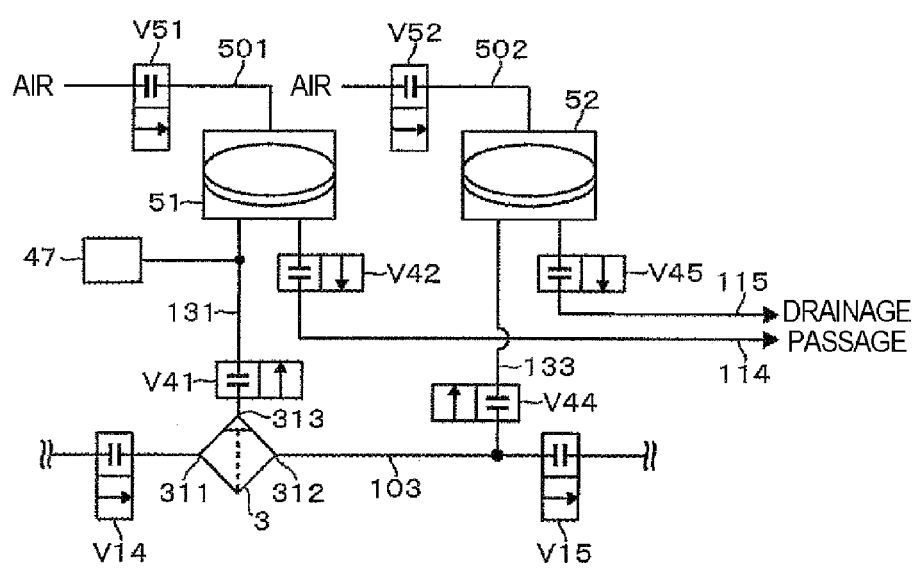
FIG. 23 is a piping diagram of a resist coating apparatus according to a third exemplary embodiment.

The third exemplary embodiment illustrated in FIG. 23 is different from the second exemplary embodiment in terms of the configuration of the decompressing unit 4. The pumps 51 and 52 are provided in the same manner as in the second exemplary embodiment. The pumps 51 and 52 are not connected to the exhaust passage 136, and the ejecting and suctioning processes are switched to each other according to whether the air is supplied or not from the air supply tubes 501 and 502. In order to perform such operations, each of the pumps 51 and 52 is configured as a pump provided with, for example, a syringe or a pneumatic cylinder. The opening/closing of the respective valves are performed in the same manner as in the second exemplary embodiment, and the negative pressure deaeration process and the following atmospheric opening process of the inside of the filter unit 3 are performed. In this example, the vacuum gauge 47 is configured to measure the degree of vacuum of the pipe 131 connected from the filter unit 3 to the pump 51.

Each of the pumps 51 and 52 may be configured by, for example, an electric pump instead of the pneumatically operating pump. In the third exemplary embodiment, reduction of the start-up time in the resist coating apparatus 1 may be achieved in the same manner as in the first exemplary embodiment.

Fourth Exemplary Embodiment

Figure 24:
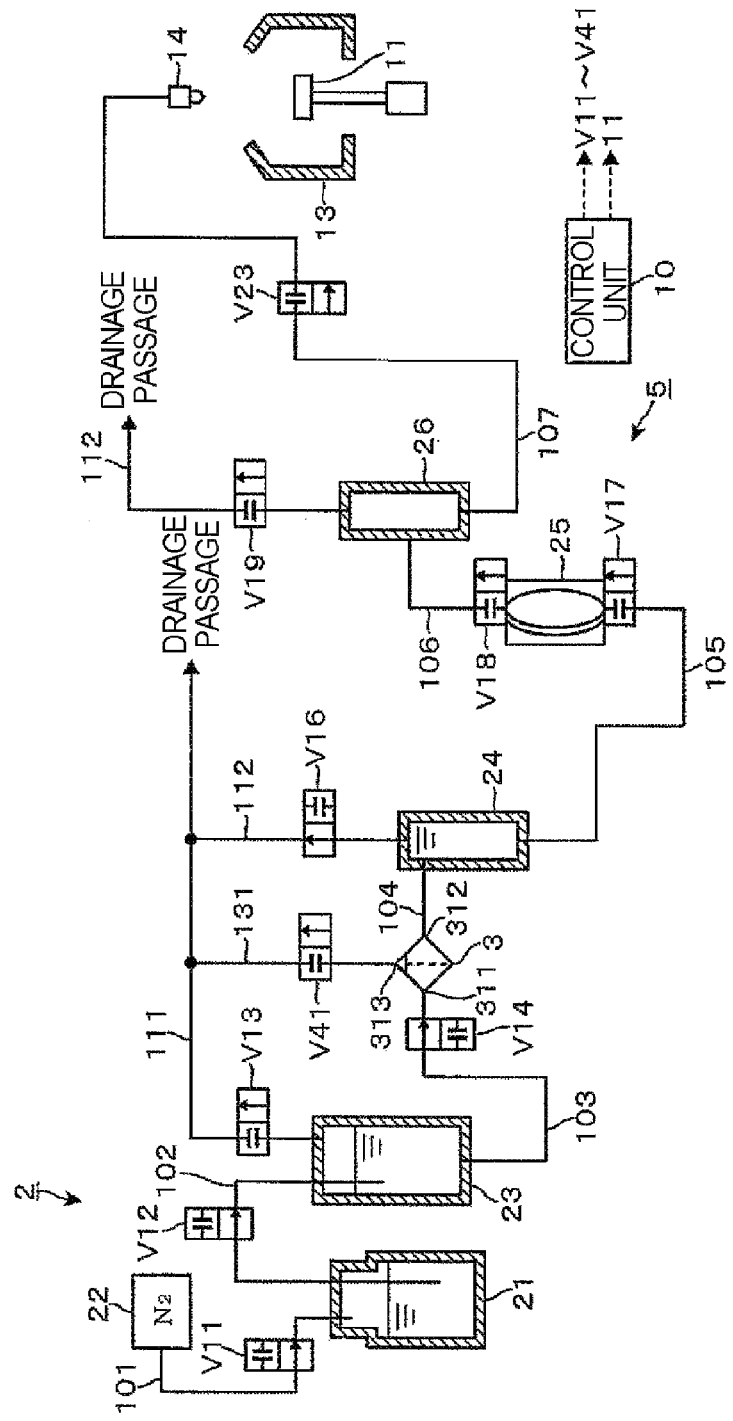
FIG. 24 is a view illustrating a resist coating apparatus in its entirety according to a fourth exemplary embodiment.

The pump 25 may be used to perform the negative pressure deaeration process without providing the decompressing unit 4. FIG. 24 illustrates such a resist coating apparatus 5 according to a fourth exemplary embodiment. The present exemplary embodiment is different from the first exemplary embodiment in terms of that the decompressing unit 4 is not provided, and the pipe 131 connected to the venting port of the filter unit 3 is connected to the drainage passage via the valve V41. In this exemplary embodiment, the secondary side valve of the filter unit 3 corresponds to the valve V16 provided in the drainage pipe 112 of the trap tank 24.

The operation of the resist coating apparatus 5 will be described using FIGS. 24 to 27. The filter unit 3 is attached in the pipes of the resist coating apparatus 5, and the resist is supplied from the resist supply source 2 to the drainage passage via the venting port 313 of the filter unit 3 in the same manner as in the first exemplary embodiment, and as illustrated in FIG. 24, is supplied to the drainage passage by passing through the external supply port 312, the trap tank 24, and the valve V16 in this order to perform the immersion process of the filter unit 3.

Figure 25:
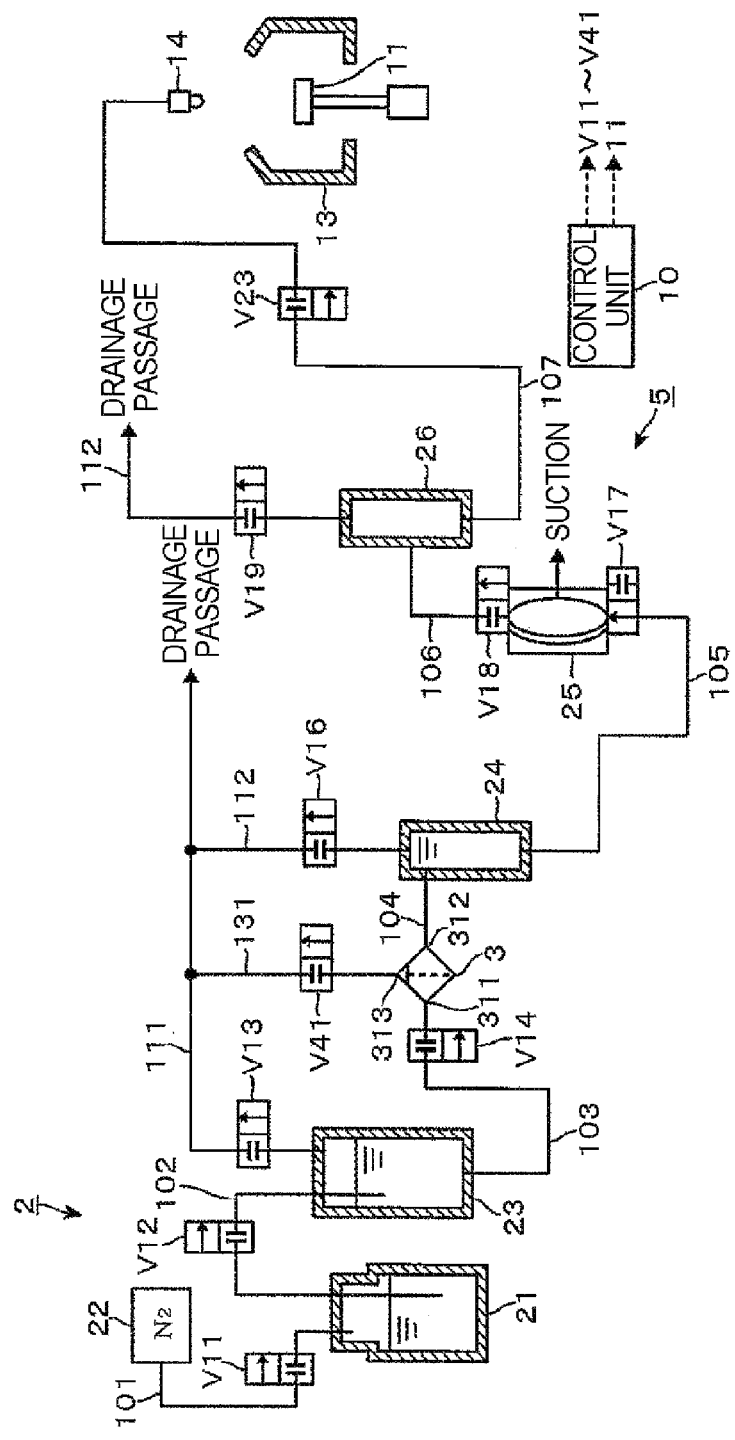
FIG. 25 is an operational view illustrating an opening/closing of a valve in the resist coating apparatus.
Figure 28:
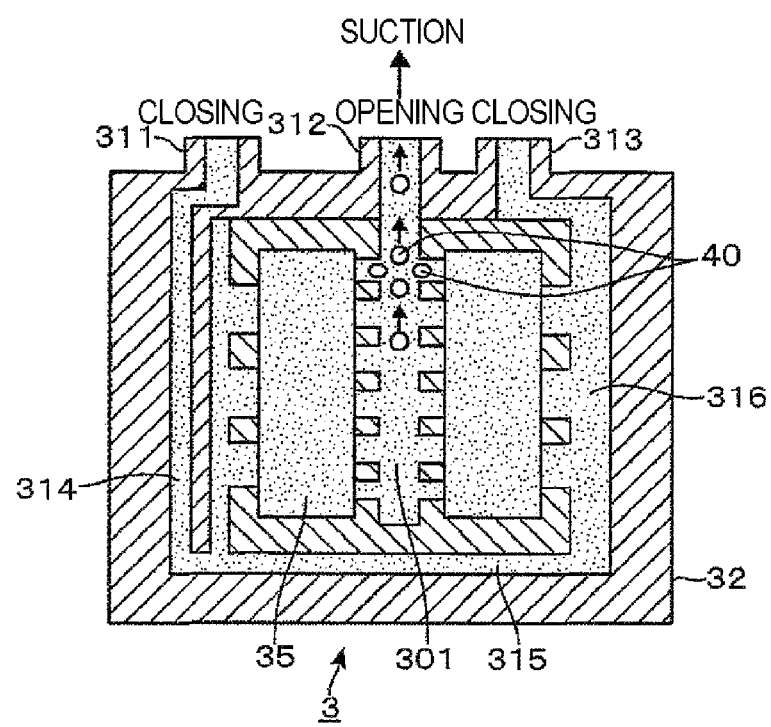
FIG. 28 is an explanatory view illustrating the appearance within the filter unit.

Then, the path extending from the bottle 21 to the liquid end tank 23, and the path extending from the liquid end tank 23 to the filter unit 3 are closed, respectively, the supply of the resist from the bottle 21 to the downstream side is stopped, and the supply of $N_2$ gas into the bottle 21 is stopped. The valve V16 is closed to close the path extending from the trap tank 24 to the drainage passage, and the valve V17 is opened to open the path extending from the filter unit 3 to the pump 25 through the trap tank 24. As illustrated in FIG. 25, a suctioning process of the pump 25 is performed to perform the negative pressure deaeration process. In the negative pressure deaeration process, the suctioning amount of the pump 25 is controlled to maintain the inside of the filter unit 3 at a pressure in a range of −51 kPa to −80 kPa, for example, −80 kPa (−80000 Pa). By these operations, as illustrated in FIG. 28, the bubbles 40 are drawn from the filtration member 35 toward the external supply port 312 of the filter unit 3.

Figure 26:
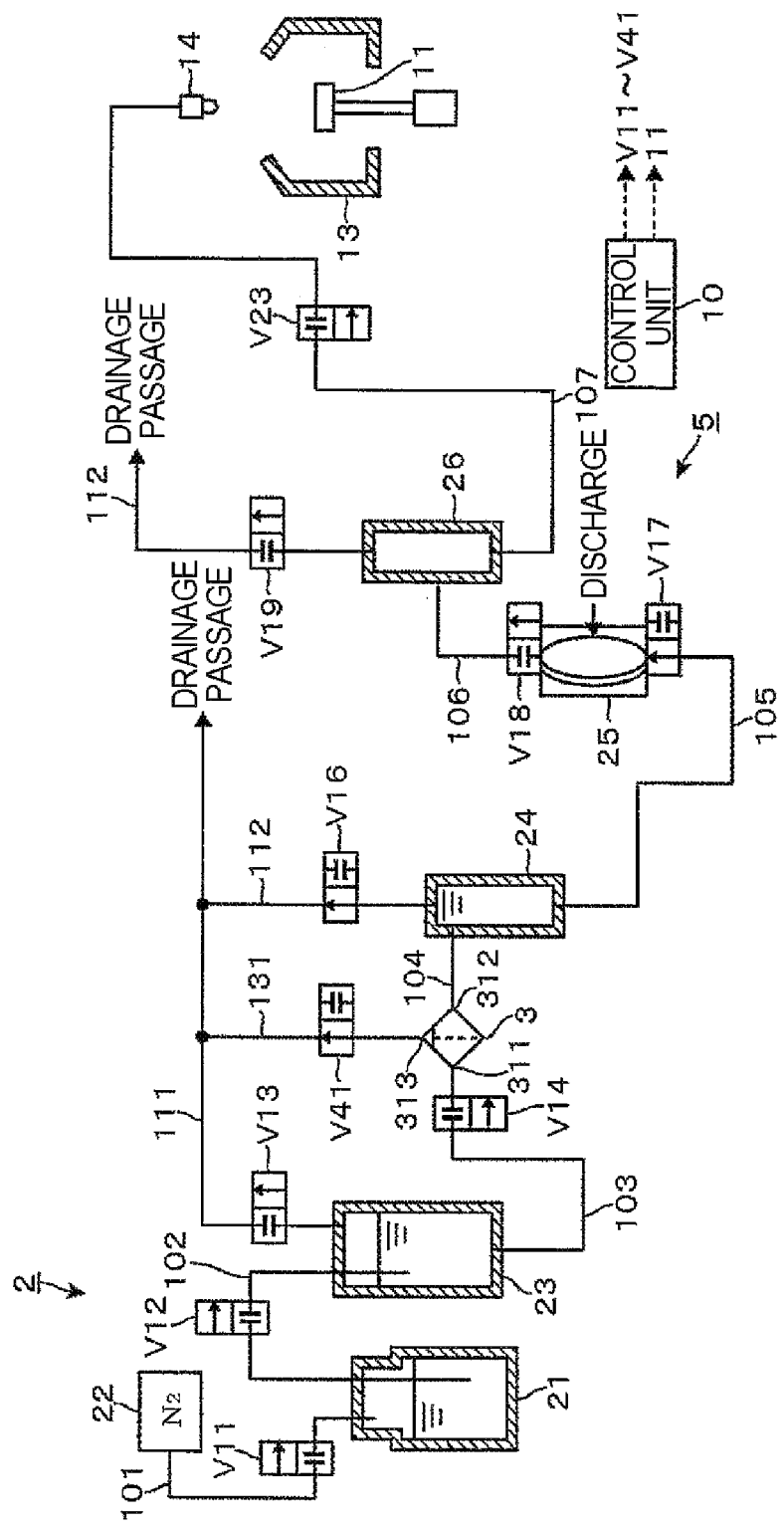
FIG. 26 is an operational view illustrating an opening/closing of a valve in the resist coating apparatus.

Then, as illustrated in FIG. 26, the valves V41 and V16 are opened, the venting port 313 of the filter unit 3 is opened to the drainage passage, and the external supply port 312 of the filter unit 3 is opened to the drainage passage through the trap tank 24 to place the inside of the filter unit 3 under an atmospheric pressure. By this, the bubbles 40 are dissolved in the resist in the same manner as in the first exemplary embodiment. Also, the suction state of the pump 25 is released, thereby placing the pump 25 in an ejection state.

Figure 27:
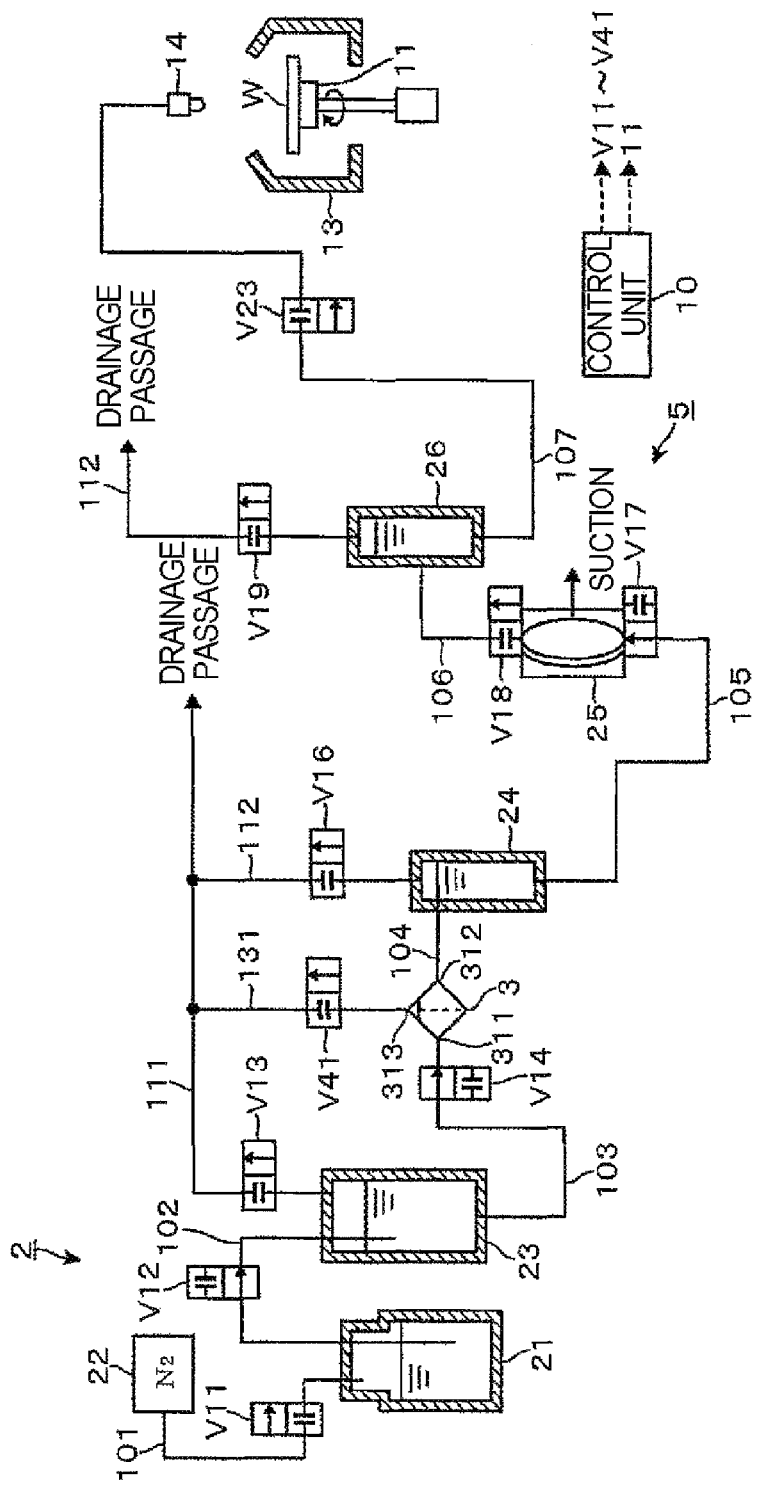
FIG. 27 is an operational view illustrating an opening/closing of a valve in the resist coating apparatus.

Then, the through-flow process is performed in the same manner as in the first exemplary embodiment such that the resist flows through the filter unit 3, the pump 25, the trap tank 26, and the nozzle 14 sequentially from the resist supply source 2 and is discharged. Also, the filling of the resist in the trap tank 26 is performed in the same manner as in the first exemplary embodiment. After the resist is continuously discharged for a predetermined time, the resist coating process is initiated and a suctioning process by the pump 25 is performed, as illustrated in FIG. 27. The suctioning process is controlled such that pressure of the filter unit 3 becomes higher than pressure at the time of the negative pressure deaeration process for the same time as in the resist coating process of the first exemplary embodiment. Then, the ejection of the pump 25 is performed, and sucked resist is supplied from the nozzle 14 to the wafer W.

In such a resist coating apparatus 5, the same effect as that in the first exemplary embodiment is achieved. This exemplary embodiment has an advantage in that the pump 25 serves as a decompressing unit 4 and the apparatus configuration may be simple. However, when the filter unit 3 is maintained at the above described relatively high negative pressure atmosphere, the pump 25 may be applied with a large load, and deteriorated. Thus, from the viewpoint of suppressing such deterioration, it is effective that the decompressing unit 4 dedicated to perform the negative pressure deaeration process is provided in the same manner as in the first exemplary embodiment.

Fifth Exemplary Embodiment

Figure 29:
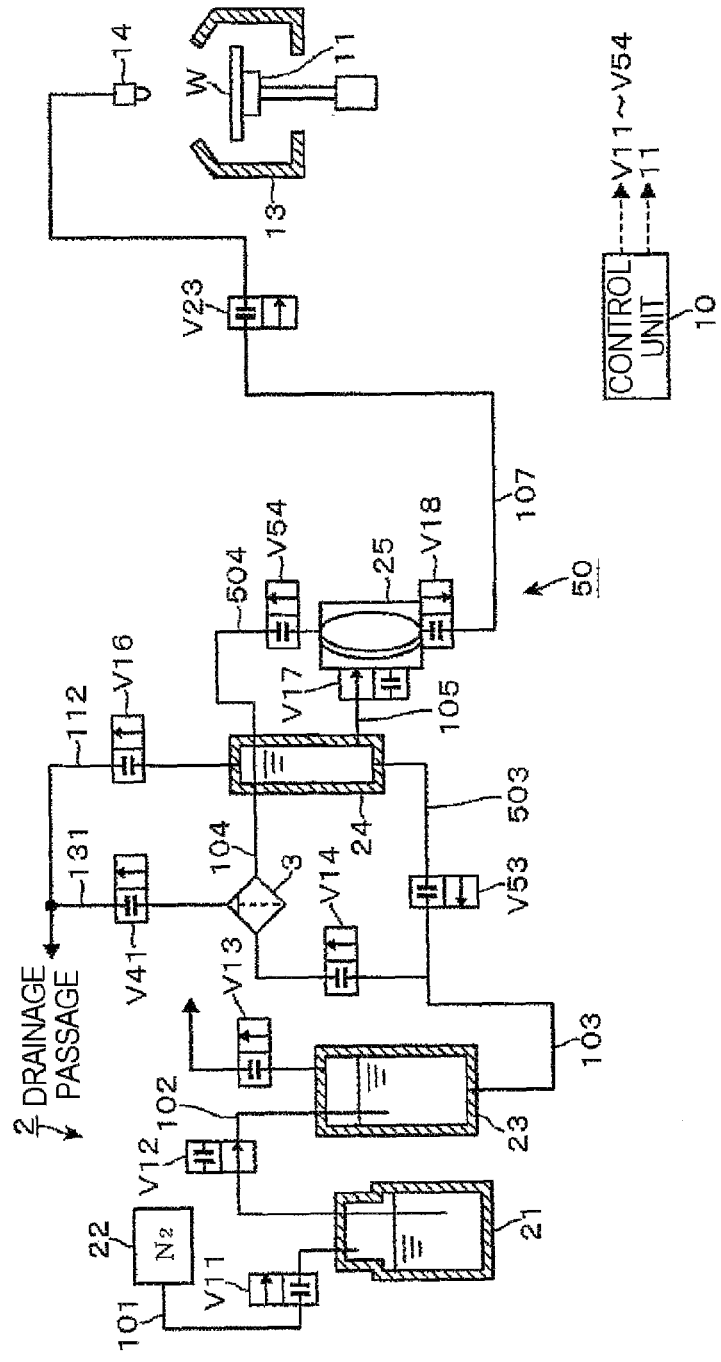
FIG. 29 is a view illustrating a resist coating apparatus in its entirety according to a fifth exemplary embodiment.

The resist coating apparatus 50 according to a fifth exemplary embodiment as illustrated in FIG. 29 is a modified exemplary embodiment of the fourth exemplary embodiment, and the negative pressure deaeration process is performed by the pump 25 in the same manner as in the fourth exemplary embodiment. The present exemplary embodiment is different from the fourth exemplary embodiment in that pipes 503 and 504 are provided, and valves V53, and V54 interposed in the pipes are provided. The pipe 503 connects the trap tank 24 to the upstream side of the valve V14 of the pipe 103. The pipe 504 connects the pump 25 to the trap tank 24. For convenience of illustration, the ejection path of the resist from the pump 25 extends to two of the pipe 504 and the pipe 107, but the pipe 504 and the pipe 107 are actually configured by branched leading ends of a pipe extending from the pump 25.

The through-flow process in this exemplary embodiment includes a process of flowing the resist by using the pipes 503 and 504 as described below in order to reduce the use amount of the resist. By opening the valves V11, V12, V14, and V17, the bottle 21 is pressurized, and the path extending from the bottle 21 to the pump 25 through the filter unit 3, and the trap tank 24 is opened. After the pump 25 performs the suctioning process, the valve V12 is closed to disconnect the bottle 21 from the liquid end tank 23, and the valves V54, V53, and V13 are opened to open the path extending from the pump 25 to the liquid end tank 23 through the trap tank 24. The pump 25 performs ejection, while returning the resist to the liquid end tank 23. The immersion process, the negative pressure deaeration process, the atmospheric opening process of the filter unit 3 and the resist coating process are performed in the same manner as in the fourth exemplary embodiment, and the descriptions thereof are omitted.

Sixth Exemplary Embodiment

Figure 30:
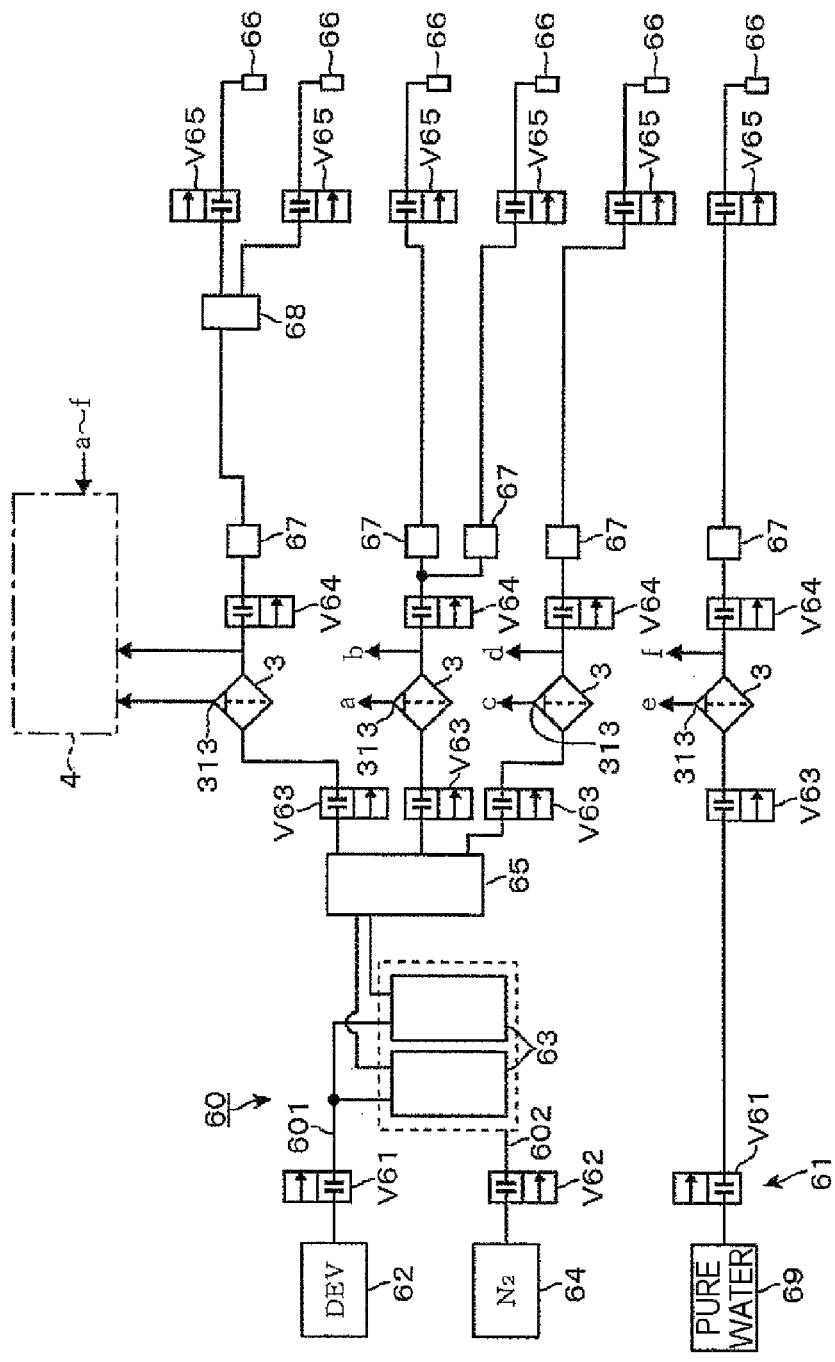
FIG. 30 is a view illustrating a piping diagram of a piping system of a developer and pure water applied to the exemplary embodiments according to the present disclosure.

Descriptions have been made for the cases where the present disclosure is employed in the resist coating apparatus, but the present disclosure is not limited to using the resist as the processing liquid. FIG. 30 schematically illustrates a developer supply system 60 configured to supply a developer, and a pure water supply system 61 configured to supply pure water. The developer supply system 60 and the pure water supply system constitute a developing apparatus which supplies a developer on a wafer W, and removes the developer on the wafer W by supplying pure water on the wafer W. In the developing apparatus, in order to supply the developer and the pure water on the wafer W in this manner, a cup 13 and a spin chuck 11 are provided in the same manner as in the resist coating apparatus 1. Further, a control unit 10 is provided that controls the operations of respective valves, such as the opening or closing valves. However, illustrations of the cup 13, the spin chuck 11, and the control unit 10 is omitted.

In the drawing, the reference numeral 62 indicates a supply unit of a developer and the reference numeral 63 indicates a tank that stores the developer supplied from the supply unit, constituting together a supply source for the developer. The tank 63 also serves a role to deliver the developer in a pressurized state to the downstream side by the supply of $N_2$ gas from an $N_2$ gas supply source 64. In the drawing, reference numerals V61 and V62 are valves configured to control the supply of the developer, and the supply of the $N_2$ gas to the tank 63, respectively. In the drawing, the reference numeral 65 indicates a divergence forming unit configured to branch off the flow path from the tank 63. In the illustrated example, three branched paths are formed.

A filter unit 3 is provided at the downstream side of the divergence forming unit 65 via a valve V63, and a valve V64 is provided at the downstream of the filter unit 3. The same decompressing unit 4 as that described in the first exemplary embodiment is connected to a venting port 313 of the filter unit 3, and the downstream side of the filter unit 3 and the upstream side of the valve V64. The configuration of the downstream side of the valve V64 is illustrated by three variations in the drawing. In one example, branches are made by a divergence forming unit 68 at the downstream side of a flow meter 67, and each branch end is connected to a nozzle 66 via a valve V65. In another example, branches are made at the downstream side of the filter unit 3, and each branch end is connected to the nozzle 66 through the flow meter 67 and the valve V65 sequentially. In the other example, the path is not diverged, and is connected to the nozzle 66 through the flow meter 67 and the valve V65 in this order. As described above, the configuration of a piping system to which the filter unit 3 is mounted is arbitrary.

In the developer supply system 60, the filter wetting process is performed in the same manner as in the first exemplary embodiment. However, as the processing liquid, instead of the resist, the developer that is supplied from the supply unit 62 to the downstream side through the tank 63 is used. After the filter wetting process, when the developer is supplied to the wafer W from the nozzle 66, the pressurized developer is supplied from the tank 63 to the downstream side. That is, in this example, at the time of developer supply, the path including the inside of the filter unit 3, which extends from the tank 63 to the nozzle 66, is placed under a positive pressure atmosphere. That is, unlike the above described respective exemplary embodiments, the present disclosure is not limited to formation of a negative pressure atmosphere at the downstream side of the filter unit 3 at the time of supplying the processing liquid to the wafer W. In the developer supply system 60, instead of the developer, a thinner may be used as the processing liquid to configure a thinner supply system. The thinner supply system may be employed in, for example, the resist coating apparatus 1 to supply the thinner to wafer W before coating of the resist, and to improve the wettability of the resist on the wafer W.

The pure water supply system 61 is provided with a piping system that extends from a pure water supply source 69 to a nozzle 66 through a valve V61, a valve V63, a filter unit 3, a flow meter 67, and a valve V65. A decompressing unit 4 is connected to the piping system in the same manner as in the developer supply system 60, and the filter wetting process is performed in the same manner as in the first exemplary embodiment. In the wetting process, instead of the resist, pure water supplied from the pure water supply source 69 is used. The pure water supply source 69 is constituted by a flow path in which the pure water flows by, for example, power of a plant, and the piping system is configured such that the pure water flowing into the piping system from the pure water supply source 69 may flow toward the nozzle 66 side by water pressure. That is, in the pure water supply system 61, when the pure water is supplied to the wafer W, the inside of the pipe extending from the pure water supply source 69 to the nozzle 66 is placed under a positive pressure atmosphere.

In the respective exemplary embodiments, the negative pressure deaeration process and the atmospheric opening process of the filter unit 3 may be repeatedly performed. Also, in the embodiments described above, the suctioning process is performed in the filter unit 3 from the external supply port 312, or the external supply port 312 and the venting port 313, but the port from which the suctioning process is performed is not limited to these examples. For example, the decompressing unit 4 may be configured such that the suctioning process is performed from the resist introducing port 311.

Figure 31:
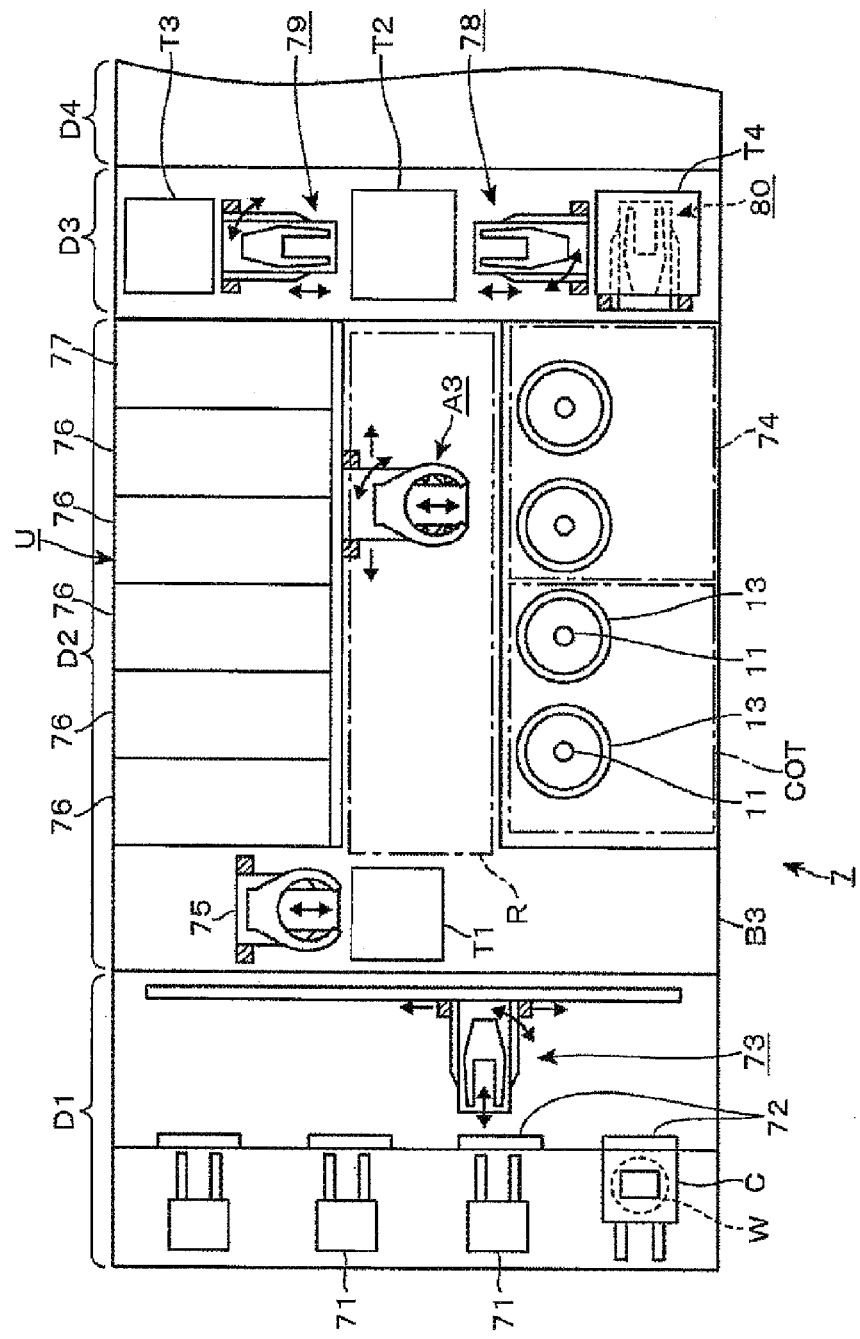
FIG. 31 is a plan view illustrating a coating/developing apparatus according to a first exemplary embodiment.
Figure 32:
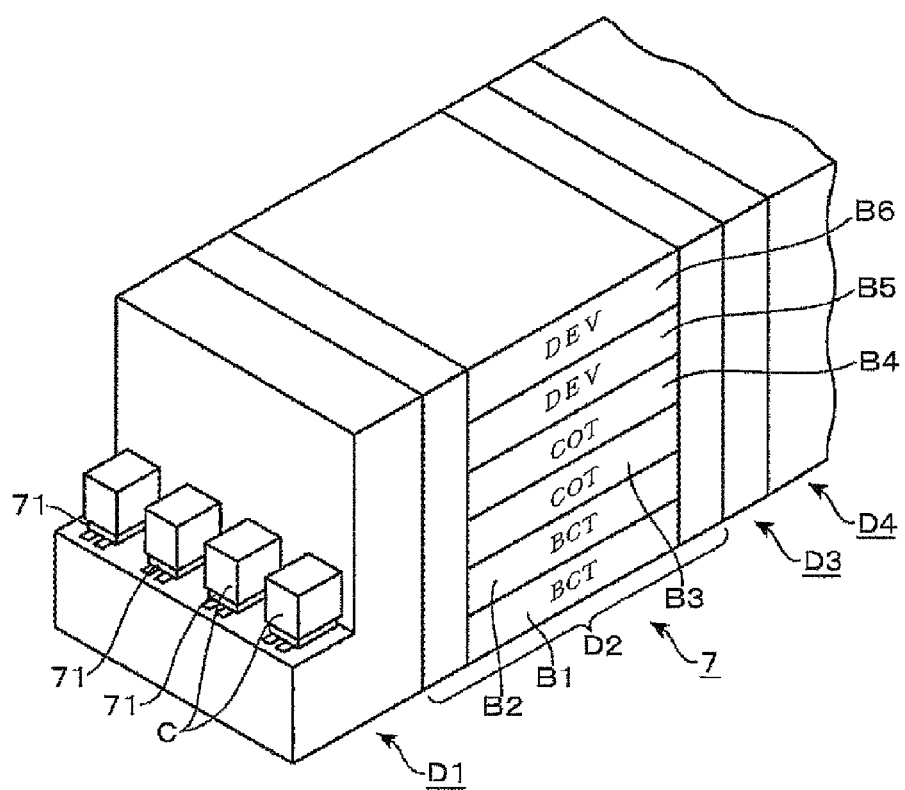
FIG. 32 is a perspective view illustrating the coating/developing apparatus.
Figure 33:
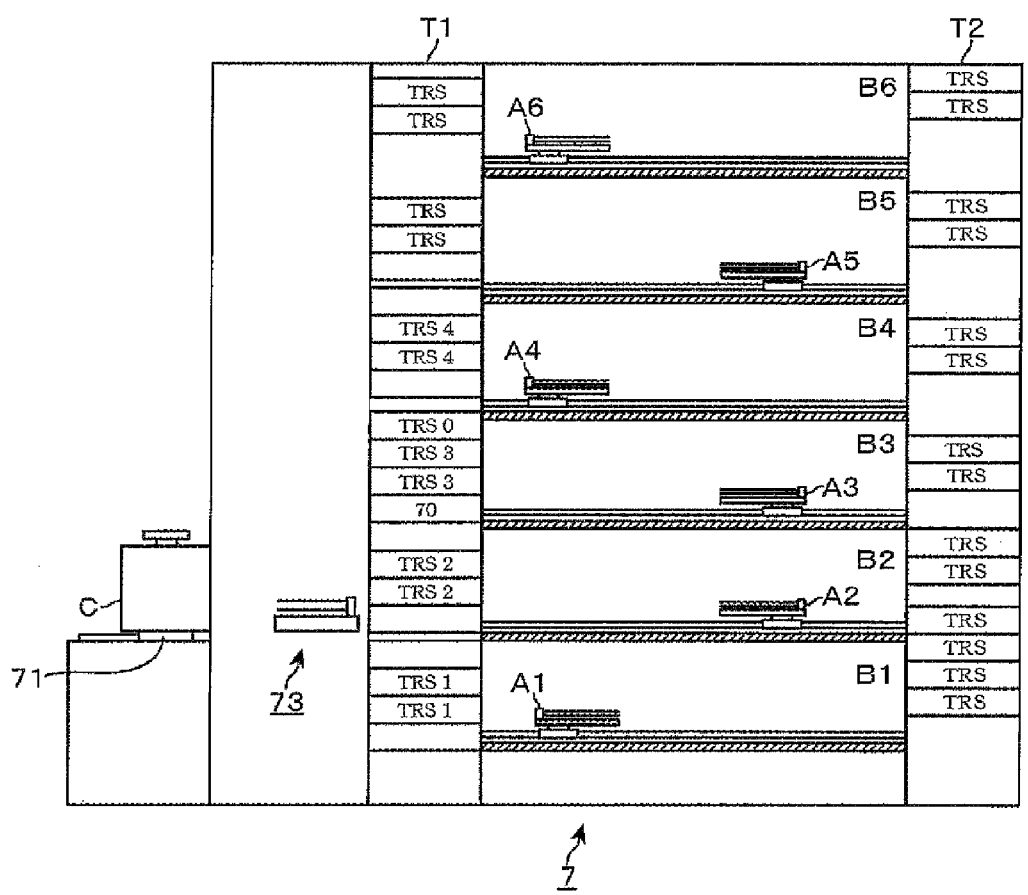
FIG. 33 is a schematic cross-sectional side view illustrating the coating/developing apparatus.

Subsequently, a coating/developing apparatus 7 to which, for example, the resist coating apparatus 1 is employed will be described. FIGS. 31, 32, and 33 are a plan view, a perspective view, and a schematic cross-sectional side view of the coating/developing apparatus 7, respectively. The coating/developing apparatus 7 is configured by linearly connecting a carrier block D1, a processing block D2, and an interface block D3 to each other. An exposure apparatus D4 is connected to the interface block D3. In the following description, the arrangement direction of the blocks D1 to D3 is considered as a front-rear direction. The carrier block D1 serves to carry a carrier C that includes a plurality of wafers W as substrates into/from the apparatus, and includes a mounting unit 71 for the carrier C, an opening/closing unit 72, and a transfer mechanism 73 configured to convey the wafers W from the carrier C through the opening/closing unit 72.

The processing block D2 is configured by first to sixth unit blocks B1 to B6 which are sequentially stacked in this order from bottom and are configured to perform a liquid processing on the wafer W. For the convenience of the descriptions, a process for forming an antireflection film at the bottom side of the wafer W may be referred to as "BCT", a process for forming a resist film on the wafer W may be referred to as "COT", and a process for forming a resist pattern on the exposed wafer W may be referred to as "DEV", respectively. Also, in the following description, the unit block may be referred to as a "layer" to avoid complication of description.

In this example, a couple of BCT layers, a couple of COT layers, and a couple of DEV layers are stacked on one another from bottom, and representatively, the COT layer B3 and B4 will be described with reference to FIG. 31. A shelf unit U is disposed at one side between left and right sides of a conveyance region R in the direction from the carrier block D1 to the interface block D3. At the other side, the resist coating apparatus 1 and a protective film forming module 74, as liquid processing modules, are provided side by side in the front-rear direction. In the coating/developing apparatus 7, since the place where the wafer W is mounted is called a module, the resist coating apparatus 1 is referred to as a resist coating module 1.

A conveying arm A3 as a substrate conveying mechanism configured to convey the wafer W is provided in the conveyance region R. The conveying arm A3 is configured to be capable of advancing and retreating, moving up and down, rotating around the vertical axis, and moving in the lengthwise direction of the conveyance region R, and may perform exchange the wafers W between respective modules of the unit block B3. The shelf unit U is configured by a heating module 76 that performs heating processing of the wafer W, and a circumferential edge exposure module 77. The circumferential edge exposure module 77 exposes the circumferential edge of the wafer W coated with the resist.

Other unit blocks B1, B2, B5 and B6 are configured in the same manner as in the unit blocks B3 and B4 except that other chemical liquids are supplied to the wafer W in the liquid processing module. The unit blocks B1 and B2 each are provided with an antireflection film forming module as a liquid processing module, instead of the resist coating module 1 and the protective film forming module 74, and the unit blocks B5 and B6 each are provided with a developing module as a liquid processing module.

A tower T1 is provided at the carrier block D1 side in the processing block D2, and an exchanging arm 75 configured to exchange wafers W with the tower T1 is provided as a vertically movable exchanging mechanism. The tower T1 is provided with, besides the exchanging module, a buffer module configured to temporarily store a plurality of wafers W, a hydrophobizing module configured to hydrophobize the surface of the wafer W, and the like, but in order to simply the description thereof, these modules are considered as exchanging modules TRS configured to exchange wafers W between the exchanging arm 75 and conveying arms A1 to A6 of the respective unit blocks B1 to B6. An inspection module 70 configured to detect particles on the surface of a wafer W is provided in the tower T1.

The interface block D3 is provided with towers T2, T3, and T4 which extend vertically across the unit blocks B1 to B6, and is provided with an interface arm 79 which is a vertically movable exchanging mechanism configured to exchange wafers W between the tower T2 and the tower T3, an interface arm 78 which is a vertically movable exchanging mechanism configured to exchange wafers W between the tower T2 and the tower T4, and an interface arm 80 which is configured to exchange wafers W between the tower T2 and the exposure apparatus D4. As illustrated in FIG. 33, the tower T2 is configured by stacking exchanging modules TRS one on another. Descriptions on the towers T3 and T4 are omitted.

The scheme of a conveyance path of a wafer W in a system constituted by the coating/developing apparatus 7 and the exposure apparatus D4 will be briefly described. The wafer W flows in the order of the carrier C→the transfer mechanism 73→the exchanging module TRS of the tower T1→the exchanging arm 75→the unit block B1 (B2)→the unit block B3 (B4)→the interface block D3→the exposure apparatus D4→the interface block D3→the unit block B5 (B6)→the exchanging module TRS of the tower T1→the transfer mechanism 73→the carrier C.

The flow of the wafer W within the processing block D2 will be described in more detail. The unit blocks B1 and B2 which form an antireflection film, and the unit blocks B3 and B4 which form a resist film, and the unit blocks B5 and B6 which perform development are duplicated, and a plurality of wafers W within the same lot are distributed for the duplicated unit blocks, and conveyed alternately to the unit blocks. For example, when a wafer W is exchanged with the unit block B1, the wafer is exchanged by the exchanging arm 75 with an exchanging module TRS1 that corresponds to the unit block B1 (an exchanging module with which the wafer W can be exchanged by the conveying arm A1) among the exchanging modules TRS in the tower T1. A reception module of the exchanging arm 75 in the tower T1 is an exchanging module TRS0 where carrying-in from the transfer mechanism 73 is performed.

When an exchanging module that corresponds to the unit block B2 is considered as a TRS2, a wafer W in the exchanging module TRS0 is delivered to the exchanging module TRS2 by the exchanging arm 75. Wafers W within the same lot are alternately distributed for the exchanging modules TRS1 and TRS2 by the exchanging arm 75.

The wafers W in the exchanging modules TRS1 and TRS2 are received by the conveying arms A1 and A2, and sequentially conveyed to the antireflection film forming module, and the heating module to form an antireflection film. The wafers W formed with the antireflection film are distributed for an exchanging module TRS3 that corresponds to the unit block B3, and an exchanging module TRS4 that corresponds to the unit block B4, and conveyed by the exchanging arm 75 through, for example, the exchanging module TRS1 or TRS2. The wafers W of the exchanging modules TRS3 and TRS4 are received by the conveying arms A3 and A4, and sequentially conveyed to the resist coating module 1, the heating module 76, and the circumferential edge exposure module 77 to form a resist film and to perform circumferential edge exposure. Then, the wafers W are conveyed to the tower T2 in the same manner as above, and are exposed by the exposure apparatus D4.

The exposed wafers W are alternately carried into the unit blocks B5 and B6 by the interface arms 78, 79, and 80 of the interface block D3 through the exchanging module TRS of the tower T2. In the unit blocks B5 and B6, the wafers W are conveyed by the conveying arms A5 and A6 in the order of the heating module→the developing module→the heating module, and returned to the carrier C through the tower T1. For example, the above described control unit 10 allows control signals to be transmitted to respective units of the coating/developing apparatus 7. By this, conveyance of wafers W and operations of modules are controlled, and these processes are performed. Further, the control unit 10 controls operations of respective units in the inspection process to be described below.

Subsequently, an inspection process that uses the inspection module 70 will be described. After the negative pressure deaeration process, the atmospheric opening process, and the resist through-flow process are sequentially performed in the resist coating module 1 of the third unit block B3, as described in the first exemplary embodiment, the carrier C that stores a plurality of testing wafers W1 is conveyed to the coating/developing apparatus 7 by a conveying mechanism (not illustrated). The testing wafers W1 are conveyed from the carrier C in the order of the transfer mechanism 73→the exchanging module TRS3→the conveying arm A3→the resist coating module 1, and are subjected to the resist coating process. Then, the testing wafers W1 are conveyed in the order of the conveying arm A3→the exchanging module TRS3→the exchanging arm 75→the inspection module 70, inspected by the inspection module 70, and returned to the carrier C by the transfer mechanism 73.

The inspection result of the inspection module 70 is transmitted to the control unit 10, and the number of particles within the resist film is counted. When the number of counted particles is not greater than a reference value, the control unit 10 enables the coating/developing apparatus 7. That is, when the carrier C is conveyed to the mounting unit 71, wafers W may be conveyed from the carrier C and processed, as described above. When the number of counted particles is greater than the reference value, the control unit 10 controls the operation of the resist coating module 1 to perform, for example, the negative pressure deaeration process, the atmospheric opening process and the resist through-flow process again. Then, new testing wafers are conveyed from the carrier C to the resist coating module 1. For example, the negative pressure deaeration process, the resist through-flow process, and the resist coating process on the testing wafers are repeated until the number of particles is not greater than the reference value.

Even though the carrier C is conveyed to the mounting unit 71, the withdrawing operation of product-manufacturing wafers W from the carrier C is suspended until the number of the particles is not greater than the reference value. When the conveyance control of wafers W, and the operation control of the resist coating module 1 are performed in this manner, it is possible to more securely suppress particles from contaminating the product-manufacturing wafers W. Whether or not to perform the negative pressure deaeration process, the atmospheric opening process and the resist through-flow process again may be determined by an operator of the apparatus based on the number of particles detected by the inspection module 70, instead of the control unit 10.

In the above described respective exemplary embodiments, after bubbles are dissolved in a resist by the atmospheric opening process, the through-flow process is performed such that the resist having the bubbles dissolved therein is drained. However, without such drainage by the through-flow process, the resist having the bubbles dissolved therein may be coated on a wafer W. Here, as described above, the through-flow process may be performed in order to avoid the re-foaming.

A target pressure atmosphere referred to by the scope of claims is a targeted predetermined pressure atmosphere when dissolving bubbles by increasing the pressure within the filter unit 3 after the negative pressure deaeration process is performed. The target pressure atmosphere corresponds to an atmospheric pressure in the respective exemplary embodiments. However, the target pressure atmosphere is not limited to the atmospheric pressure, and may be any pressure atmosphere. For example, as described in the first exemplary embodiment, after the immersion process of the filter unit 3, a resist is allowed to flow through the path extending from the nozzle 14 to the bottle 21. Then, the negative pressure deaeration process is performed to open the inside of the filter unit 3 to atmosphere. At this time, before the pressure within the filter unit 3 reaches an atmospheric pressure by rising, opened valves are closed such that the inside of the filter unit 3 may be maintained under a negative pressure atmosphere. Then, the pump 25 performs suctioning and ejecting processes to supply the resist to the wafer W. That is, in this case, the negative pressure atmosphere is a target pressure atmosphere.

(Evaluation Test 1)

Figure 34:
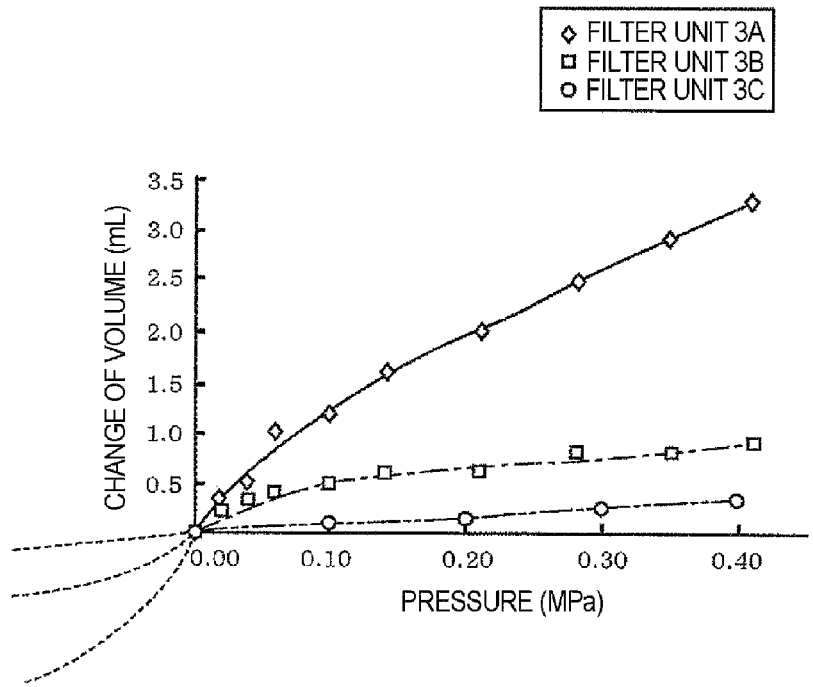
FIG. 34 is a graph illustrating the result of an evaluation test.

Three kinds of conventional filter units 3 were prepared, and the pressures in the filter units 3 were changed. Then, according to such a change of the pressure, a changed amount of a volume was measured with respect to a volume when the inside pressure was an atmospheric pressure. In this test, the pressure was being changed to be an atmospheric pressure or more. The three kinds of filter units 3 are indicated by 3A, 3B, and 3C. In the graph of FIG. 34, test results on the filter units 3A, 3B, and 3C are indicated by solid line, one-dot dashed line, and two-dot dashed line, respectively. In the graph, the horizontal axis represents a difference (unit: MPa) between an atmospheric pressure and a set pressure, and the vertical axis represents a changed amount of volume (unit: mL).

From the graph, it is confirmed that the volumes are increased in the respective filter units 3, as the inside pressures are increased. From the test result, it is thought that when the pressure is an atmospheric pressure or less, volumes of the respective filter units 3A to 3C are changed as illustrated in dotted line graphs. That is, it is thought that when the inside of the filter unit 3 is decompressed into a negative pressure at the time of the negative pressure deaeration process as described above, the volume within the filter unit 3 is changed, thereby flowing a processing liquid around the filtration member 35. That is, it is thought that even though the processing liquid is not supplied from the outside of the filter unit 3, the processing liquid may be allowed to flow into the filter unit 3. It is assumed that the flow of the processing liquid facilitates capillarity, and also facilitates penetration of the processing liquid into the filtration member 35, and removal of bubbles from the filtration member 35, as described in the first exemplary embodiment.

(Evaluation Test 2)

Subsequently, according to the first exemplary embodiment, a negative pressure deaeration process, an atmospheric opening process of the filter unit 3, a through-flow process, and a coating process on a wafer W were performed. Meanwhile, in the evaluation test 2, a thinner, as a processing liquid, instead of a resist, was used to perform the test. In the through-flow process, the thinner was supplied to a plurality of wafers W while changing the flow rate of the thinner to be supplied to the downstream side. Then, on the respective wafers W, particles with a size of 32 nm or more were measured. This is set as evaluation test 2-1. Also, in evaluation test 2-2, the same test was performed as in evaluation test 2-1 except that the negative pressure deaeration process and the following atmospheric opening were not performed.

Figure 35:
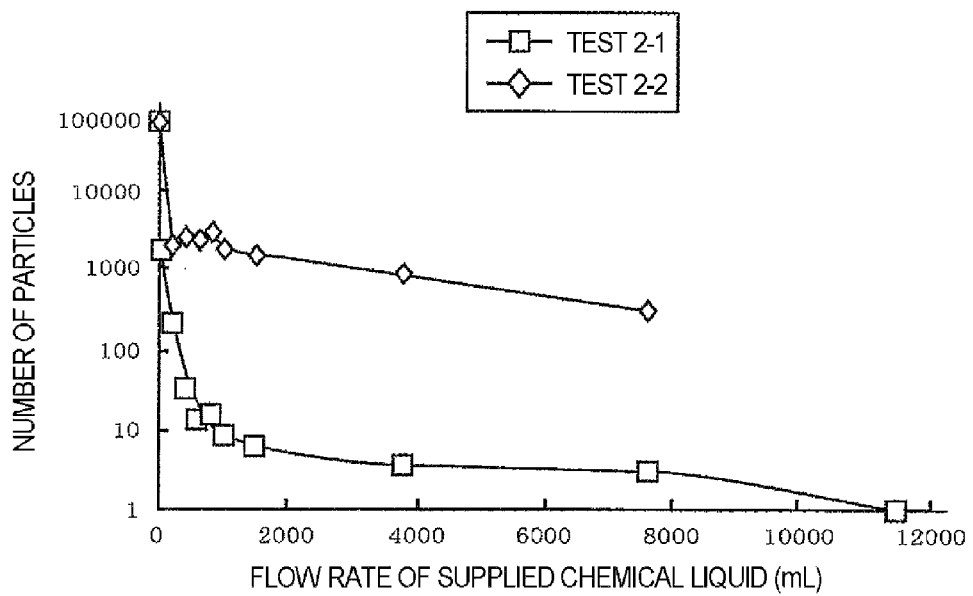
FIG. 35 is a graph illustrating the result of an evaluation test.

FIG. 35 is a graph illustrating results of evaluation tests 2-1 and 2-2. In the graph, the horizontal axis represents a flow rate of the thinner used in the through-flow process of the thinner, and the vertical axis represents the number of particles. As illustrated in the graph, in evaluation test 2-1, the number of particles may be reduced to 10 or less by using 500 mL or more of thinner. However, in evaluation test 2-2, even when the flow rate of the thinner is 500 mL or more, 100 or more particles were detected. From the result of the evaluation test 2, it is confirmed that by using the method of the present disclosure, it is possible to quickly remove bubble from the filtration member 35, and then reduce the time required for the through-flow process for a processing liquid, thereby shortening the start-up time for the apparatus.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for supplying a processing liquid in a liquid processing apparatus, comprising:
    providing a filter unit including a filtration member in a dried state in the liquid processing apparatus, the filter unit being provided with an introducing port through which the processing liquid is introduced into the filter unit, an external supply port through which the processing liquid is supplied to a nozzle, and a venting port through which an inside atmosphere of the filter unit is exhausted, and each of the external supply port and the venting port is configured to be selectively connected either to a drainage passage or to an exhaust passage;
    filling the processing liquid into the filter unit by opening the introducing port and the venting port while closing the external supply port, the venting port being connected to the drainage passage draining the processing liquid from the filter unit such that the filtration member of the filter unit is immersed in the processing liquid;
    continuing the filling of the processing liquid into the filter unit by opening the introducing port and the external supply port while closing the venting port, the external supply port being connected to the drainage passage, thereby continuing the immersing of the filtration member of the filter unit;
    after the continuing of the filling the processing liquid into the filter unit, decompressing inside of the filter unit into a first pressure atmosphere which is a negative pressure atmosphere lower than a pressure at the time of supplying the processing liquid to an object to be processed, the decompressing being performed by closing the introducing port while opening the external supply port and the venting port, and each of the external supply port and the venting port being connected to the exhaust path thereby removing bubbles from the filter unit;
    after the decompressing, boosting the inside of the filter unit from the first pressure atmosphere to be atmospheric pressure closing port while opening the external supply port and the venting port, and each of the external supply port and the venting port being connected to the drainage passage;
    after the boosting, flowing the processing liquid into the filter unit from a primary side of the filter unit in a state where a secondary side of the filter unit is maintained at a second pressure atmosphere which is higher than the first pressure atmosphere but lower than the atmospheric pressure; and
    after the flowing, supplying the processing liquid flowing from the filter unit to the object to be processed through a nozzle thereby performing a liquid processing.

2. The method of claim 1, wherein the first pressure atmosphere is formed by decompression of a process pump that is provided between the filter unit and the nozzle, and configured to deliver the processing liquid to the nozzle.

3. The method of claim 1, wherein the first pressure atmosphere is formed by a decompressing unit separate from a process pump that is configured to deliver the processing liquid to the nozzle.

4. The method of claim 1, wherein the first pressure atmosphere has a pressure ranging from −51 kPa to −80 kPa.

5. The method of claim 1, wherein after supplying the processing liquid to the object to be processed to perform the liquid processing, an inspection of the liquid processing on the object is performed,
    wherein when an inspection result is a certain predeterminable level of bubble quality in the processing liquid, the series of processes from placing the inside of the filter unit under the first pressure atmosphere to placing the inside of the filter unit under the second pressure atmosphere are performed again.

6. An apparatus for supplying a processing liquid to an object to be processed from a nozzle to perform a liquid processing, comprising:
    a processing liquid supply source, a filter unit including a filtration member and the nozzle provided sequentially from an upstream side, the filter unit being provided with an introducing port through which the processing liquid is introduced into the filter unit, an external supply port through which the processing liquid is supplied to a nozzle, and a venting port through which an inside atmosphere of the filter unit is exhausted, and each of the external supply port and the venting port is configured to be selectively connected either to a drainage passage or an exhaust passage;
    a primary side valve, a secondary side valve, and a venting valve provided at a primary side, a secondary side, and a vent of the filter unit, respectively;
    a decompressing unit configured to decompress inside of the filter unit; and
    a control unit configured to control the valves and the decompressing unit,
    wherein the control unit executes a program stored in a nontransitory computer-readable recording medium that, when executed, causes a computer to perform:
    filling the processing liquid into the filter unit by supplying the processing liquid from the primary side of the filter unit such that the filtration member of the filter unit is immersed in the processing liquid, by opening the introducing port and the venting port while closing the external supply port, the venting port being connected to the drainage passage draining the processing liquid from the filter unit;

continuing the filling of the processing liquid into the filter unit by opening the introducing port and the external supply port while closing the venting port, the external supply port being connected to the drainage passage, thereby continuing the immersing of the filtration member of the filter unit;

after the continuing of the filling the processing liquid into the filter unit, decompressing the inside of the filter unit into a first pressure atmosphere which is a negative pressure atmosphere lower than a pressure at the time of supplying the processing liquid to an object to be processed by the decompressing unit, the decompressing being performed by closing the introducing port while opening the external supply port and the venting port, and each of the external supply port and the venting port being connected to the exhaust path thereby removing bubbles from the filter unit;

after the decompressing, boosting the inside of the filter unit from the first pressure atmosphere to be an atmospheric pressure by closing the introducing port while opening the external supply port and the venting port, and each of the external supply port and the venting port being connected to the drainage passage;

after the boosting, flowing the processing liquid into the filter unit from the primary side of the filter unit in a state where the secondary side of the filter unit is maintained at a second pressure atmosphere which is higher than the first pressure atmosphere but lower than the atmospheric pressure; and after the flowing, supplying the processing liquid flowing from the filter unit to the object through the nozzle to perform the liquid processing.

7. The apparatus of claim 6, wherein a process pump is provided between the filter unit and the nozzle, and
the flowing of the processing liquid from the primary side of the filter unit is performed by forming the second pressure atmosphere by the process pump.

8. The apparatus of claim 7, wherein the decompressing unit additionally serves as the process pump.

9. The apparatus of claim 7, wherein the decompressing unit is provided separately from the process pump.

10. The apparatus of claim 7, wherein the first pressure atmosphere has a pressure ranging from −51 kPa to −80 kPa.

11. The apparatus of claim 7, wherein the boosting of the inside of the filter unit to be the target pressure atmosphere is to place the inside of the filter unit to be an atmospheric pressure.

12. The apparatus of claim 6, wherein the first pressure atmosphere has a pressure ranging from −51 kPa to −80 kPa.

13. The apparatus of claim 6, wherein the boosting of the inside of the filter unit to be the target pressure atmosphere is to place the inside of the filter unit to be an atmospheric pressure.

14. A nontransitory computer-readable storage medium storing a computer program, wherein the computer program is used in a liquid processing apparatus for supplying a processing liquid, and has a group of steps for executing a processing liquid supply method which are incorporated in the computer program, and wherein the method includes providing a filter unit including a filtration member in a dried state in the liquid processing apparatus, the filter unit being provided with an introducing port through which the processing liquid is introduced into the filter unit, an external supply port through which the processing liquid is supplied to a nozzle, and a venting port through which an inside atmosphere of the filter unit is exhausted, and each of the external supply port and the venting port is configured to be selectively connected either to a drainage passage or to an exhaust passage; filling the processing liquid into the filter unit by opening the introducing port and the venting port while closing the external supply port, the venting port being connected to the drainage passage draining the processing liquid from the filter unit such that the filtration member of the filter unit is immersed in the processing liquid; continuing the filling of the processing liquid into the filter unit by opening the introducing port and the external supply port while closing the venting port, the external supply port being connected to the drainage passage, thereby continuing the immersing of the filtration member of the filter unit; after the continuing the filling of the processing liquid into the filter unit, decompressing the inside of the filter unit into a first pressure atmosphere which is a negative pressure atmosphere lower than a pressure at the time of supplying the processing liquid to an object to be processed, the decompressing being performed by closing the introducing port while opening the external supply port and the venting port, and each of the external supply port and the venting port being connected to the exhaust path thereby removing bubbles from the filter unit; after the decompressing, boosting the inside of the filter unit from the first pressure atmosphere to be atmospheric pressure by closing the introducing port while opening the external supply port and the venting port, and each of the external supply port and the venting port being connected to the drainage passage; after the boosting, flowing the processing liquid into the filter unit from a primary side of the filter unit in a state where a secondary side of the filter unit is maintained at a second pressure atmosphere which is higher than the first pressure atmosphere but lower than the atmospheric pressure; and after the flowing, supplying the processing liquid flowing from the filter unit to the object to be processed through a nozzle thereby performing a liquid processing, wherein the apparatus is configured to supply the processing liquid to an object to be processed from a nozzle to perform a liquid processing, and comprises a processing liquid supply source, a filter unit and the nozzle provided sequentially from an upstream side.

* * * * *